(12) United States Patent
Iwatsu et al.

(10) Patent No.: US 7,773,548 B2
(45) Date of Patent: Aug. 10, 2010

(54) SYSTEM AND ASSOCIATED METHOD OF SERVICE PROVISION BASED UPON BROADCAST STATE INFORMATION

(75) Inventors: Takeshi Iwatsu, Kanagawa (JP); Noriyuki Sakoh, Kanagawa (JP); Shinsuke Yamashita, Kanagawa (JP); Jun Moriya, Tokyo (JP); Yasuhiro Murase, Tokyo (JP)

(73) Assignee: Sony Corporation, Tokyo (JP)

( * ) Notice: Subject to any disclaimer, the term of this patent is extended or adjusted under 35 U.S.C. 154(b) by 1083 days.

(21) Appl. No.: 10/556,728

(22) PCT Filed: May 18, 2004

(86) PCT No.: PCT/JP2004/007015

§ 371 (c)(1),
(2), (4) Date: Nov. 14, 2005

(87) PCT Pub. No.: WO2005/006607

PCT Pub. Date: Jan. 20, 2005

(65) Prior Publication Data

US 2006/0209733 A1    Sep. 21, 2006

(30) Foreign Application Priority Data

Jul. 14, 2003   (JP) .............................. 2003-274302
Aug. 11, 2003  (JP) .............................. 2003-291741
Sep. 4, 2003   (JP) .............................. 2003-313167
Sep. 24, 2003  (JP) .............................. 2003-332563

(51) Int. Cl.
    *H04H 20/71*  (2008.01)
(52) U.S. Cl. ..................... 370/312; 455/3.01; 455/3.05; 455/3.06; 455/414.1; 455/414.3; 370/432; 700/94; 725/62; 725/112

(58) Field of Classification Search ....... 455/3.01–3.06, 455/414.1, 414.3; 370/312, 432; 700/94; 725/62, 112
See application file for complete search history.

(56) References Cited

U.S. PATENT DOCUMENTS 6,507,727 B1 *  1/2003  Henrick .................... 455/3.06

(Continued)

FOREIGN PATENT DOCUMENTS

JP            9-160852           6/1997

(Continued)

OTHER PUBLICATIONS

U.S. Appl. No. 10/526,902, filed Aug. 16, 2005, Yamashita et al.

(Continued)

*Primary Examiner*—Ajit Patel
*Assistant Examiner*—Dung Lam
(74) *Attorney, Agent, or Firm*—Oblon, Spivak, McClelland, Maier & Neustadt, L.L.P.

(57) ABSTRACT

A method includes receiving, from a broadcast receiver, identification information for identifying a currently received broadcast station. The method also includes receiving, from an external server, state information which indicates a state of a service for providing information concerning the currently received broadcast station corresponding to the identification information. In addition, the method includes providing information, from a server, depending on whether a URL is included in the state information. The method further includes transmitting, to the broadcast receiver, the state information and an address corresponding to the service, after receiving the identification information from the broadcast receiver and the state information from the external server.

13 Claims, 17 Drawing Sheets

U.S. PATENT DOCUMENTS

| | | | |
|---|---|---|---|
| 2003/0104832 A1* | 6/2003 | Ferris | 455/550 |
| 2005/0060701 A1 | 3/2005 | Murase | |
| 2005/0091679 A1 | 4/2005 | Tanaka et al. | |

FOREIGN PATENT DOCUMENTS

| | | |
|---|---|---|
| JP | 2000-222360 | 8/2000 |
| JP | 2001-14207 | 1/2001 |
| JP | 2001-117872 | 4/2001 |
| JP | 2001-195421 | 7/2001 |
| JP | 2001-331387 | 11/2001 |
| JP | 2002-55866 | 2/2002 |
| JP | 2002-135671 | 5/2002 |
| JP | 2002-358283 | 12/2002 |
| JP | 2003-501987 | 1/2003 |
| JP | 2003-67661 | 3/2003 |
| JP | 2003-99317 | 4/2003 |
| JP | 2003-274302 | 9/2003 |
| JP | 2003-295945 | 10/2003 |
| JP | 2003-295947 | 10/2003 |

OTHER PUBLICATIONS

U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/572,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.
"Technology after 'Google'", Nikkei Byte, Oct. 22, 2002, No. 234, p. 66-69.
Kazumi Ishii, "IFour Retrieval Ninja 2003 for Windows", DOS/V magazine, Softbank publishing Co., Ltd., May 15, 2002, vol. 11, No. 10, p. 190.
"In-site search and meta search", Search technique of IT information using Internet, AI publication Co., Ltd., May 28, 2000, No. 255, First edition, p. 78-83.

* cited by examiner

SYSTEM AND ASSOCIATED METHOD OF SERVICE PROVISION BASED UPON BROADCAST STATE INFORMATION

TECHNICAL FIELD

The present invention relates to an information provision method which appropriately provides a client from a specified server via a network with state information indicative of information provision services associated with radio programs, for example.

BACKGROUND ART

Conventionally, radio receivers are used for audio stereo reproduction systems such as all-in-one stereo systems and separate stereo components, portable audio systems, car-mounted audio systems, and the like. The radio receiver receives and demodulates broadcast signals broadcast from a radio station and allows users to listen to programs and musical compositions.

On the other hand, the radio station publicizes various information about its programs on the Internet homepage. For example, the radio station sends broadcast signals to the audience, and provides it with musical composition information about broadcast musical compositions such as their titles and artist names as well as names and numbers of CDs that record the musical compositions.

There is proposed an audio reproduction apparatus (e.g., see Patent Document 1: Jpn. Pat. Appln. No. 2003-274302) as a client terminal having the radio reception function and the Internet connection function implemented in one system that simultaneously performs listening of radio programs and acquisition of musical composition information.

This audio reproduction apparatus allows a user to listen to a program from the audio reproduction apparatus and acquire musical composition information from associated information provision servers. The musical composition information includes titles, artist names, and the like of musical compositions that are broadcast in the program.

When listening to a radio program using the audio reproduction apparatus, a user may access a homepage concerning the radio program to acquire musical composition information about musical compositions broadcast in the radio program. However, the homepage may supply no service to provide musical composition information. In such case, the homepage displays a message such as "failed to acquire musical composition information" to the user.

Based on such message only, however, the user cannot determine the reason for failing to acquire the musical composition information, whether the network traffic is congested, whether there is no service of providing musical composition information after all, or whether the infrastructure or an associated information provision server fails. There have been problems of repeatedly sending requests to acquire the musical composition information, for example.

DISCLOSURE OF THE INVENTION

The present invention has been made in consideration of the foregoing. It is therefore an object of the present invention to propose an information provision method capable of providing state of an information provision service before access to an associated information provision server providing the information provision service.

To solve the above-mentioned problem, an information provision method according to the present invention comprises the steps of: receiving broadcast station identification information for identifying a currently received broadcast station from a broadcast receiver; and transmitting state information which indicates states of an information provision service concerning the broadcast station corresponding to the broadcast station identification information and an address corresponding to the information provision service to the broadcast receiver.

The broadcast receiver can be provided with not only the state information indicative of states of the information provision service associated with the broadcast station, but also the address corresponding to the information provision service. A user can be clearly notified of service states of an information provision service prior to access to the information provision service.

An information provision apparatus according to the present invention comprises: a reception means for receiving broadcast station identification information for identifying a currently received broadcast station from a broadcast receiver; and a transmission means for transmitting state information which indicates states of an information provision service concerning the broadcast station corresponding to the broadcast station identification information and an address corresponding to the information provision service to the broadcast receiver.

The broadcast receiver can be provided with not only the state information indicative of states of the information provision service associated with the radio station, but also the address corresponding to the information provision service. A user can be clearly notified of service states of an information provision service prior to access to the information provision service.

An information provision program according to the present invention allows an information processing apparatus to perform the steps of: receiving broadcast station identification information for identifying a currently received broadcast station from a broadcast receiver; and transmitting state information which indicates states of an information provision service concerning the broadcast station corresponding to the broadcast station identification information and an address corresponding to the information provision service to the broadcast receiver.

The broadcast receiver can be provided with not only the state information indicative of states of the information provision service associated with the radio station, but also the address corresponding to the information provision service. A user can be clearly notified of service states of an information provision service prior to access to the information provision service.

An information reception method according to the present invention comprises the steps of: transmitting broadcast station identification information for identifying a currently received broadcast station; and receiving state information which indicates states of an information provision service concerning the broadcast station corresponding to the broadcast station identification information and an address corresponding to the information provision service from the information provision apparatus.

The broadcast station identification information is used to identify the currently received broadcast station. A client terminal sends this broadcast station identification information to the information provision apparatus. In this manner, the client terminal can receive the following from the information provision apparatus: the state information indicating states of the information provision service associated with the broadcast station; and the address corresponding to the information provision service. It is possible to be clearly notified of service states of an information provision service prior to access to the information provision service.

An information reception apparatus according to the present invention comprises: a transmission means for transmitting broadcast station identification information for identifying a currently received broadcast station to an information provision apparatus; and a reception means for receiving state information which indicates states of an information provision service concerning the broadcast station corresponding to the broadcast station identification information and an address corresponding to the information provision service from the information provision apparatus.

The broadcast station identification information is used to identify the currently received broadcast station. A client terminal sends this broadcast station identification information to the information provision apparatus. In this manner, the client terminal can receive the following from the information provision apparatus: the state information indicating states of the information provision service associated with the broadcast station; and the address corresponding to the information provision service. It is possible to be clearly notified of service states of an information provision service prior to access to the information provision service.

An information reception program according to the present invention allows an information processing apparatus to perform the steps of: transmitting broadcast station identification information for identifying a currently received broadcast station to an information provision apparatus; and receiving state information which indicates states of an information provision service concerning the broadcast station corresponding to the broadcast station identification information and an address corresponding to the information provision service from the information provision apparatus.

The broadcast station identification information is used to identify the currently received broadcast station. A client terminal sends this broadcast station identification information to the information provision apparatus. In this manner, the client terminal can receive the following from the information provision apparatus: the state information indicating states of the information provision service associated with the broadcast station; and the address corresponding to the information provision service. It is possible to be clearly notified of service states of an information provision service prior to access to the information provision service.

According to the present invention, the broadcast receiver can be provided with not only the state information indicative of states of the information provision service associated with the broadcast station, but also the address corresponding to the information provision service. In this manner, it is possible to realize the information provision method, the information provision apparatus, and the information provision program capable of allowing users to be clearly notified of service states of an information provision service prior to access to the information provision service.

According to the present invention, the broadcast station identification information is used to identify the currently received broadcast station. A client terminal sends this broadcast station identification information to the information provision apparatus. In this manner, the client terminal can receive the following from the information provision apparatus: the state information indicating states of the information provision service associated with the broadcast station; and the address corresponding to the information provision service. It is possible to realize the information reception method, the information reception apparatus, and the information reception program capable of being clearly notified of service states of an information provision service prior to access to the information provision service.

BEST MODE FOR CARRYING OUT THE INVENTION

Embodiments of the present invention will be described in detail with reference to the accompanying drawings.

Figure 1:
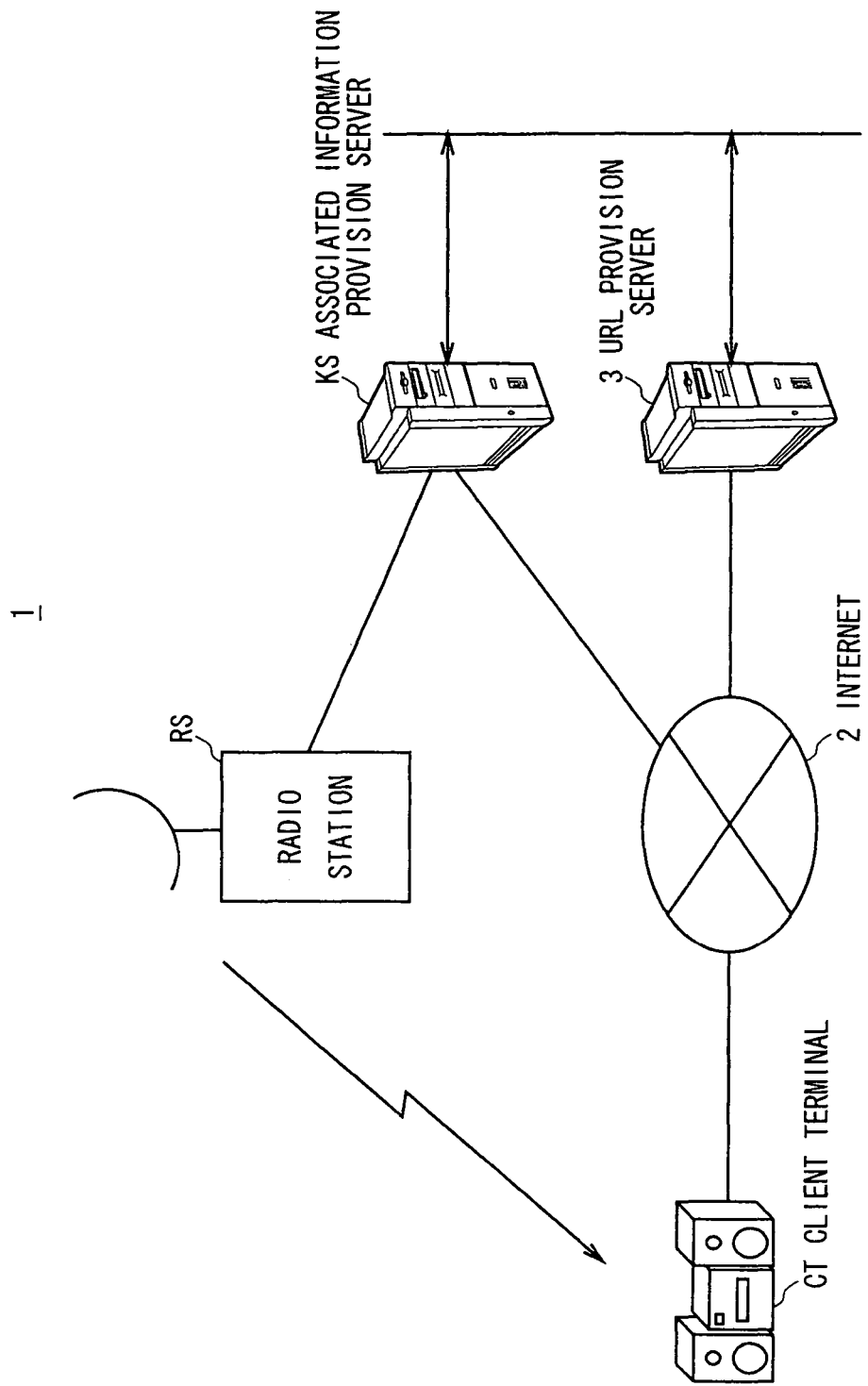
FIG. 1 is a schematic diagram showing the overall configuration of an information provision system according to a first embodiment of the present invention.

(1) First Embodiment (1-1) Overall Configuration of the Information Provision System As shown in FIG. 1, the reference numeral 1 denotes an information provision system constituting the present invention as a whole. A client terminal CT receives broadcast from a radio station RS.

In the information provision system 1, the radio station RS connects with an associated information provision server KS comprising a computer. A leased line is used for this connection. In place of the radio station RS, the associated information provision server KS provides a homepage of the radio station RS. In response to an acquisition request from the client terminal CT, the associated information provision server KS can provide musical composition information as associated information about musical compositions broadcast from the radio station RS via a network 2 such as the Internet.

In the information provision system 1, a URL provision server 3 comprising a computer is notified of URL (Uniform Resource Locator) information that indicates an access destination of the information provision service provided by the associated information provision server KS using the homepage and the like.

If a change is made in the URL indicating the access destination of the information provision service, the URL provision server 3 manages the changed URL according to notification from the associated information provision server KS. The URL provision server 3 can always provide the most recent URL in response to an inquiry from the client terminal CT about the access destination of the information provision service provided by the radio station RS.

Since the radio broadcast is limited to receivable areas, the same frequency may be commonly shared among a plurality of areas. For example, the 80.0 MHz frequency is used by FM Tokyo in the Tokyo metropolitan area and by FM Aomori in the Tohoku district.

Accordingly, the client terminal CT cannot specify the radio station RS only by specifying the frequency for the URL provision server 3. The client terminal CT further notifies the URL provision server 3 of specific information called a call sign to specify the radio station RS. In this manner, the client terminal CT can reliably receive the URL from the URL provision server 3. As mentioned above, the URL indicates the access destination of the information provision service provided by the radio station RS.

(1-2) Configuration of the Radio Station RS

Figure 2:
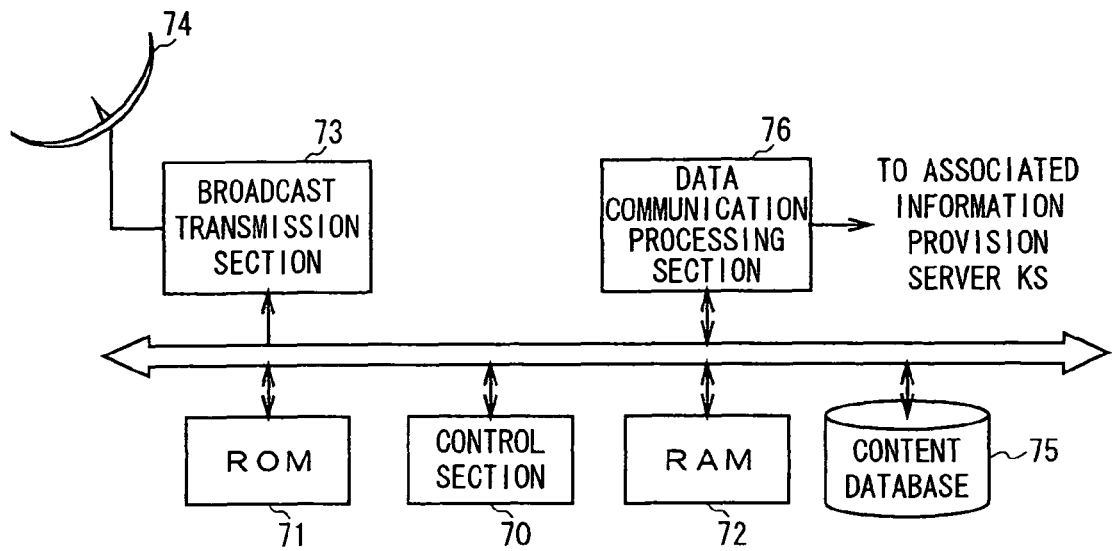
FIG. 2 is a schematic block diagram showing the configuration of a radio station.

As shown in FIG. 2, the radio station RS includes a control section 70 comprising a CPU (Central Processing Unit). The control section 70 uses a ROM (Read Only Memory) 71 and RAM (Random Access Memory) 72 to start basic programs such as an OS (Operating System) and various application programs. Based on these programs, the control section 70 controls the entire system in a unified fashion. The radio station RS performs processes such as program broadcasting to broadcast programs from a broadcast transmission section 73 to the client terminal CT via an antenna 74.

The radio station RS uses a content database 74 to store many contents such as previously recorded programs and musical compositions to be broadcast in the programs. The radio station RS broadcasts the program according to a program schedule and broadcasts musical composition contents in the program as needed.

In this case, the radio station RS uses a data communication processing section 76 to notify the associated information provision server KS that musical compositions are broadcast in the program. In addition, the radio station RS notifies the associated information provision server KS which program is currently being broadcast.

(1-3) Configuration of the URL Provision Server 3

Figure 3:
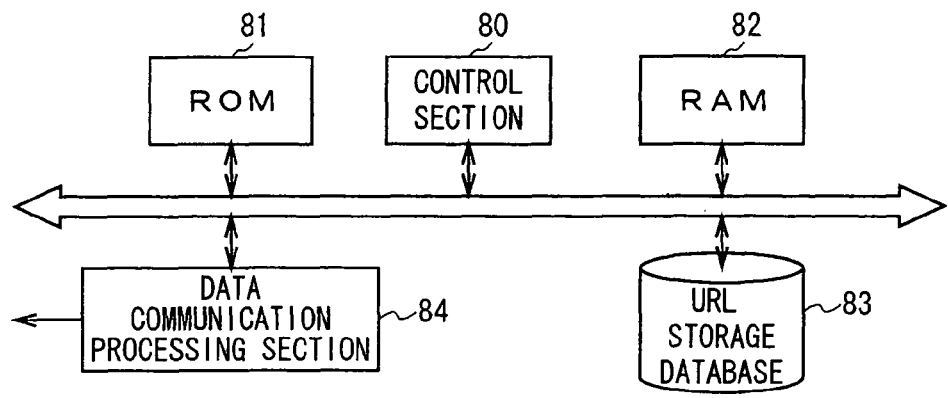
FIG. 3 is a schematic block diagram showing the configuration of a URL provision server.

As shown in FIG. 3, the URL provision server 3 includes a control section 80 comprising a CPU. The control section 80 uses ROM 81 and RAM 82 to start basic programs such as an OS and various application programs. Based on these programs, the URL provision server 3 performs overall control, specified operations, and the like.

The URL provision server 3 receives a call sign from the client terminal CT, then the server 3 searches a URL storage database 83 for a URL of the homepage provided as an information provision service by the radio station RS corresponding to the call sign. The URL provision server 3 returns the URL to the client terminal CT via a data communication processing section 84.

The URL provision server 3 is also connected to the associated information provision server KS (FIG. 1). The URL provision server 3 receives state information representing service states in the associated information provision server KS via the data communication processing section 84. The URL provision server 3 provides the client terminal CT with the state information as well as the URL.

(1-4) Configuration of the Associated Information Provision Server

Figure 4:
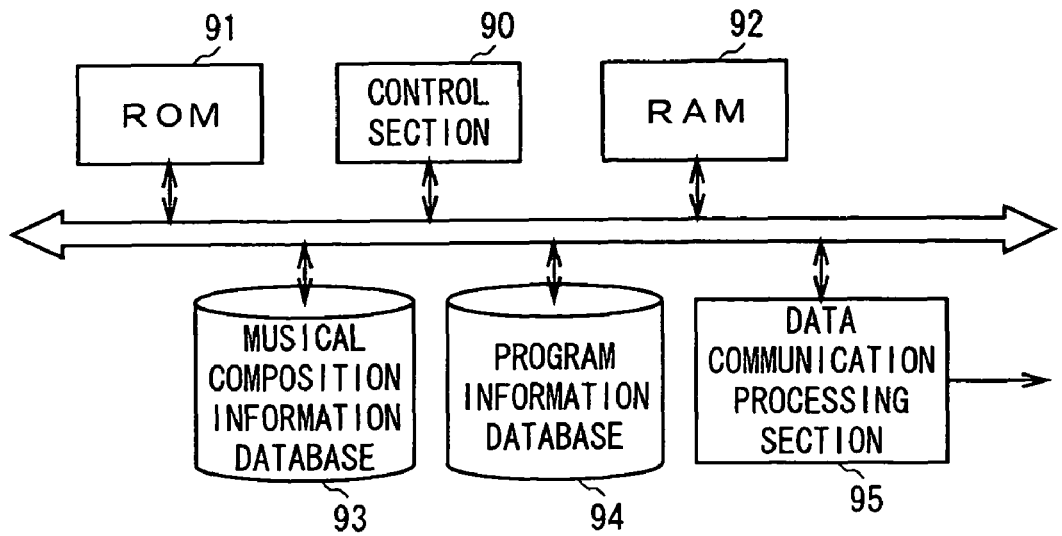
FIG. 4 is a schematic block diagram showing the configuration of an associated information provision server.

As shown in FIG. 4, the associated information provision server KS includes a control section 90 comprising a CPU. The control section 90 uses a ROM 91 and RAM 92 to start basic programs such as an OS and various application programs. Based on these programs, the associated information provision server KS performs overall control, specified operations, and the like.

The associated information provision server KS searches a musical composition information database 93 for musical composition information about musical compositions broadcast in a program by the radio station RS, for example. The associated information provision server KS provides the musical composition information as associated information to the client terminal CT via the data communication processing section 95.

Further, the associated information provision server KS searches a program information database 94 for program information about performers, a DJ name, genres, and the like associated with a program broadcast by the radio station RS. The associated information provision server KS provides the program information as associated information to the client terminal CT via the data communication processing section 95.

(1-5) Circuit Configuration of the Client Terminal CT

Figure 5:
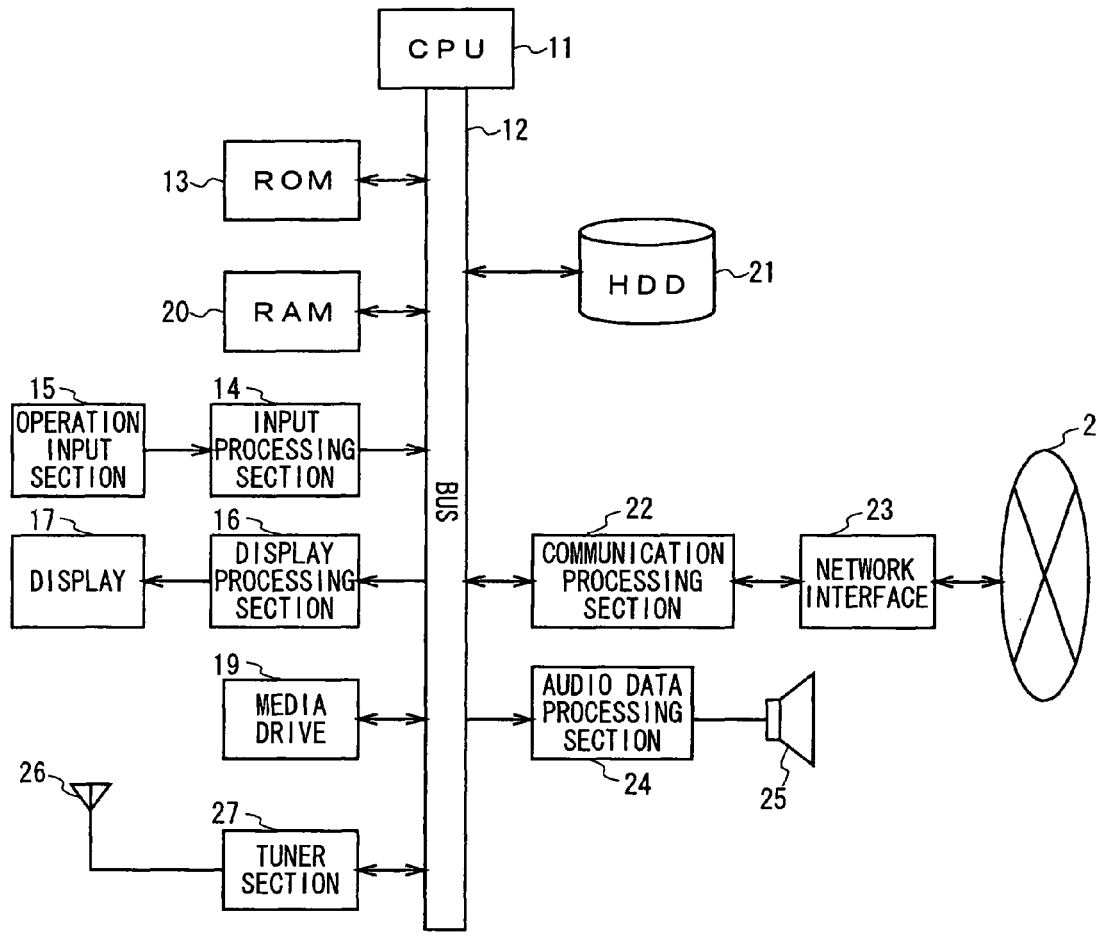
FIG. 5 is a schematic block diagram showing the circuit configuration of a client terminal.

As shown in FIG. 5, a CPU 11 of the client terminal CT reads basic programs such as an OS and various application programs from a ROM 13 connected via a bus 12 and expands the programs in a RAM 20. Based on these programs, the CPU 11 performs overall control, specified operations, and the like. For example, the CPU 11 performs communication operations via the network 2, input/output operations in relation to users, reproduction of contents from media, writing of contents downloaded from the radio station RS onto a hard disk drive (HDD) 21, management of contents, and the like.

The operation input section 15 sends input information to an input processing section 14. The input information corresponds to user operations for various operation devices provided on the surface of the main unit cabinet or a remote controller (not shown). The input processing section 14 applies specified processes to the input information and sends it as an operation command to the CPU 11. The CPU 11 performs processes corresponding to the operation command.

A display 17 represents a display device such as a liquid crystal display and may be directly attached to the surface of the main unit cabinet or may be externally connected. The display 17 displays processing results from the CPU 11 and the other various information.

A media drive 19 reproduces, for example, a CD (Compact Disc) or Memory Stick (registered trademark) comprising flash memory and the like. An audio data processing section 24 digital-to-analog converts the reproduction result which is then output from a 2-channel speaker 25.

When the CPU 11 reproduces data, e.g., a musical composition's audio content via the media drive 19, the audio content can be stored as an audio data file in a hard disk drive 21.

Further, the CPU 11 uses the media drive 19 to read a plurality of still pictures stored in Memory Stick. These still pictures can be displayed as a slideshow on the display 17 via a display processing section 16.

In addition, the CPU 11 can randomly access and read a plurality of musical compositions stored in the hard disk drive 21 to reproduce the musical compositions in a user-specified order like a jukebox.

A tuner section 27 is equivalent to an AM or FM radio tuner, for example. The tuner section 27 demodulates a broadcast signal received at an antenna 26 under the control of the CPU 11. The result, as a broadcast audio, is passed to the audio data processing section 24 and is output from the speaker 25.

A communication processing section 22 encodes transmission data under the control of the CPU 11. The communication processing section 22 uses a network interface 23 to transmit data to external network-compliant devices via a network 2. The communication processing section 22 uses the network interface 23 to receive data from external network-compliant devices and decodes the received data. The communication processing section 22 then transfers the decoded data to the CPU 11.

(1-6) Directory Management of Contents

Figure 6:
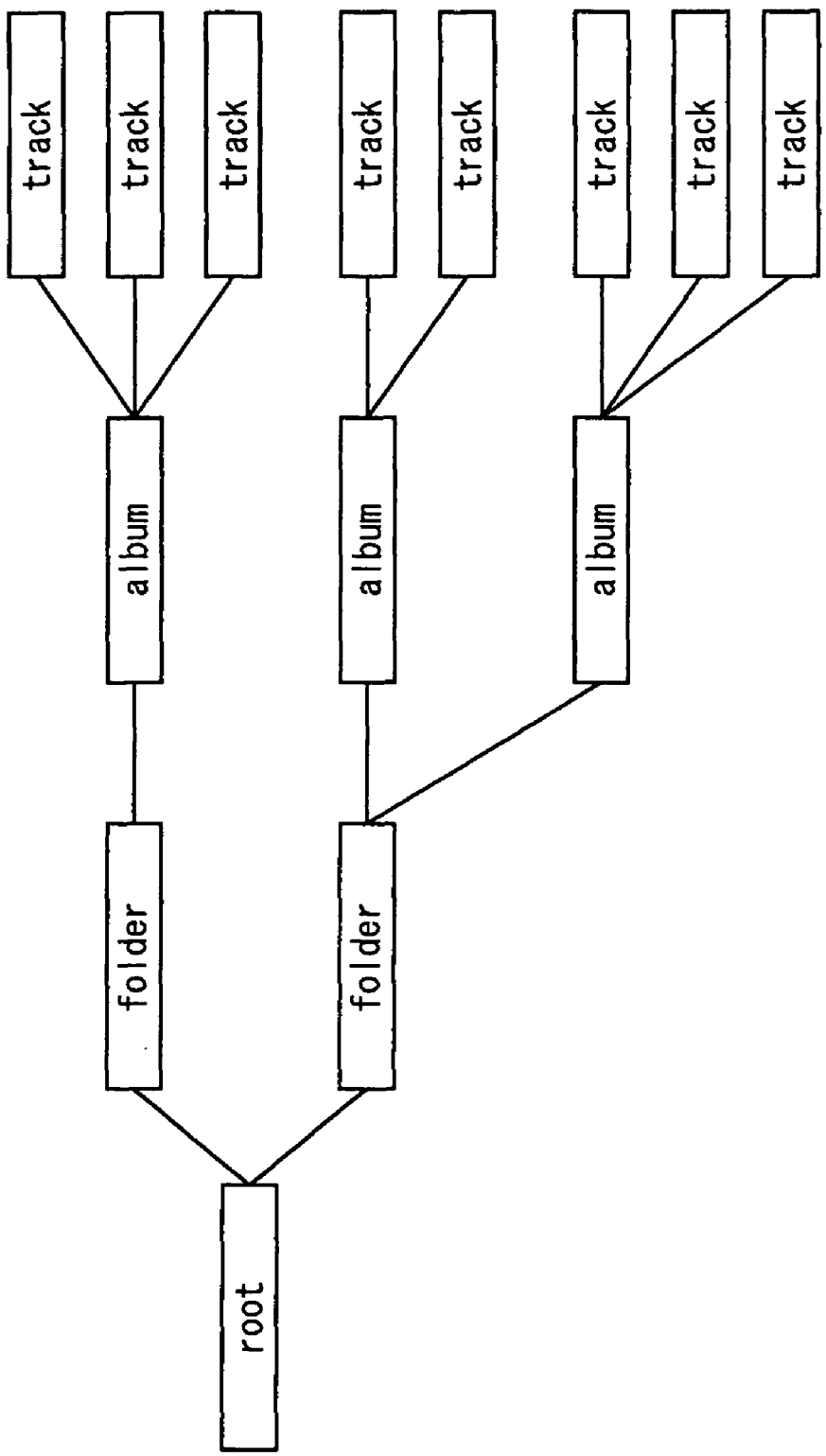
FIG. 6 is a schematic diagram illustrating directory management of contents.

The CPU 11 of the client terminal CT manages contents to be stored in the hard disk drive 21 according to directory structure as shown in FIG. 6. There are created any number of "folder" directories within a specified range under a "root" directory. The "folder" directory is created in accordance with a genre of contents, an owner user, and the like.

Under the "folder" directory, there are created any number of "album" directories within a specified range. The "album" directory corresponds to one album title, for example. The "album" directory stores one or more "track" files belonging to the "album" directory. That is to say, the "track" file is equivalent to one musical composition, i.e., a content.

A database file is stored in the hard disk drive 21 and is used for the directory management of contents.

(1-7) Program Module Configuration of the Client Terminal CT

Figure 7:
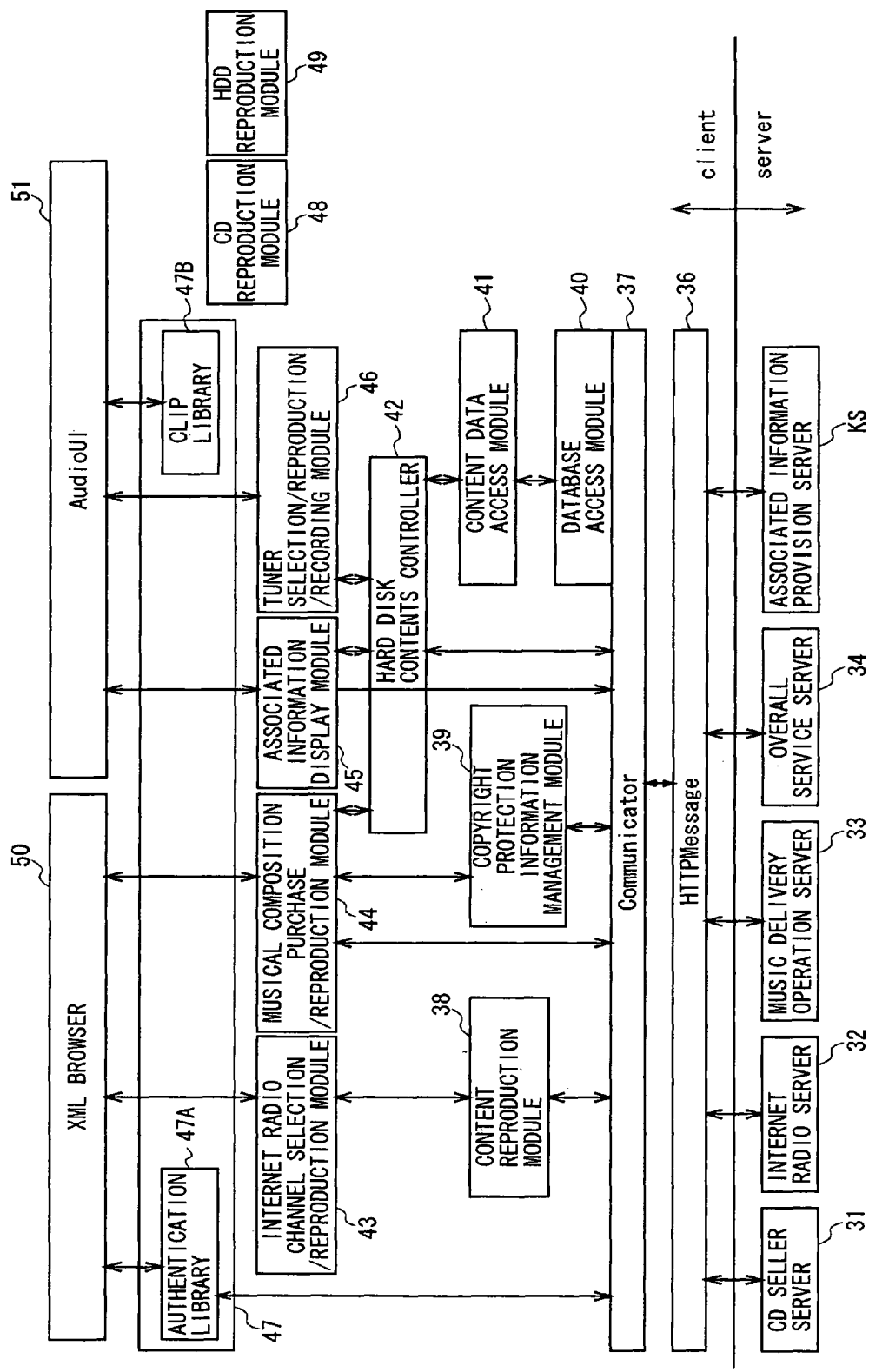
FIG. 7 is a schematic diagram showing program modules of the client terminal.

As shown in FIG. 7, the client terminal CT comprises program modules operating under the OS. Specifically, the client terminal CT interacts with various servers such as a CD seller server 31 to sell CDs, an Internet radio server 32, a music delivery operation server 33, an overall service server 34, and the associated information provision server KS.

An HTTP (Hyper Text Transfer Protocol) message program 36 uses HTTP communication to interact with various servers such as the CD seller server 31, the Internet radio server 32, the music delivery operation server 33, the overall service server 34 to provide overall services, and the associated information provision server KS. A communicator program 37 is a program module to exchange data with the HTTP message program 36.

Above the communicator program 37, there are a content reproduction module 38 and a copyright protection information management module 39. The content reproduction module 38 interprets codec information of contents and reproduces the contents. The copyright protection information management module 39 handles information about copyright protection. The content reproduction module 38 and the copyright protection information management module 39 correspond to an Internet radio channel selection/reproduction module 43 and a musical composition purchase/reproduction module 44, respectively. The Internet radio channel selection/reproduction module 43 selects and reproduces Internet radio channels. The musical composition purchase/reproduction module 44 controls purchase of musical compositions and reproduces samples.

An XML (eXtensible Markup Language) browser 50 is positioned above the Internet radio channel selection/reproduction module 43 and the musical composition purchase/reproduction module 44. The XML browser 50 interprets XML files from various servers and displays them on the display 17.

For example, a user selects a musical composition using the XML browser 50. The selected musical composition is purchased through the musical composition purchase/reproduction module 44 and is written to the hard disk drive 21 via a hard disk contents controller 42.

The communicator program 37 connects with an authentication library 47A of a library 47. The authentication library 47A authenticates various servers such as the overall service server 34.

Above the communicator program 37, there are a database access module 40, a content data access module 41, and a hard disk contents controller 42.

The database access module 40 accesses various databases configured in the hard disk drive 21. The content data access module 41 accesses contents stored in the hard disk drive 21. The hard disk contents controller 42 manages contents stored in the hard disk drive 21.

Above the hard disk contents controller 42, there are an associated information display module 45 and a tuner selection/reproduction/recording module 46. The associated information display module 45 displays titles and artist names of musical compositions broadcast by the radio station RS. The tuner selection/reproduction/recording module 46 selects a radio station RS and records musical composition contents received from the radio station RS on the hard disk drive 21.

When a musical composition is received from the radio station RS selected via an audio user interface 51, for example, the received musical composition is written to the hard disk drive 21 via the content data access module 41.

The associated information display module 45 receives associated information from the associated information provision server KS via the HTTP message program 36. The associated information includes titles and artist names of the musical compositions currently broadcast by the radio station RS corresponding to the tuner selection/reproduction/recording module 46. The associated information is displayed on the display 17 via the audio user interface (UI) 51.

The associated information can be not only displayed on the display 17 via the audio user interface 51, but also temporarily stored in a clip library 47B of the library 47. According to a user instruction, the associated information is finally stored in the hard disk drive 21 via the database access module 40.

The other program modules for the client terminal CT include a CD reproduction module 48 and an HDD reproduction module 49. The CD reproduction module 48 reproduces CDs. The HDD reproduction module 49 reproduces the hard disk drive 21. A reproduction result is output via the audio data processing section 24 and the speaker 25.

(1-8) State Information Provision Sequence of the Information Provision Service The radio station RS provides a homepage as one of information provision services. The URL provision server 3 provides the client terminal CT with the homepage's most recent and accurate URL via the network 2. At the same time, the client terminal CT is provided with states of the information provision service. A state information provision process is used for this purpose. The following describes the state information provision process.

Figure 8:
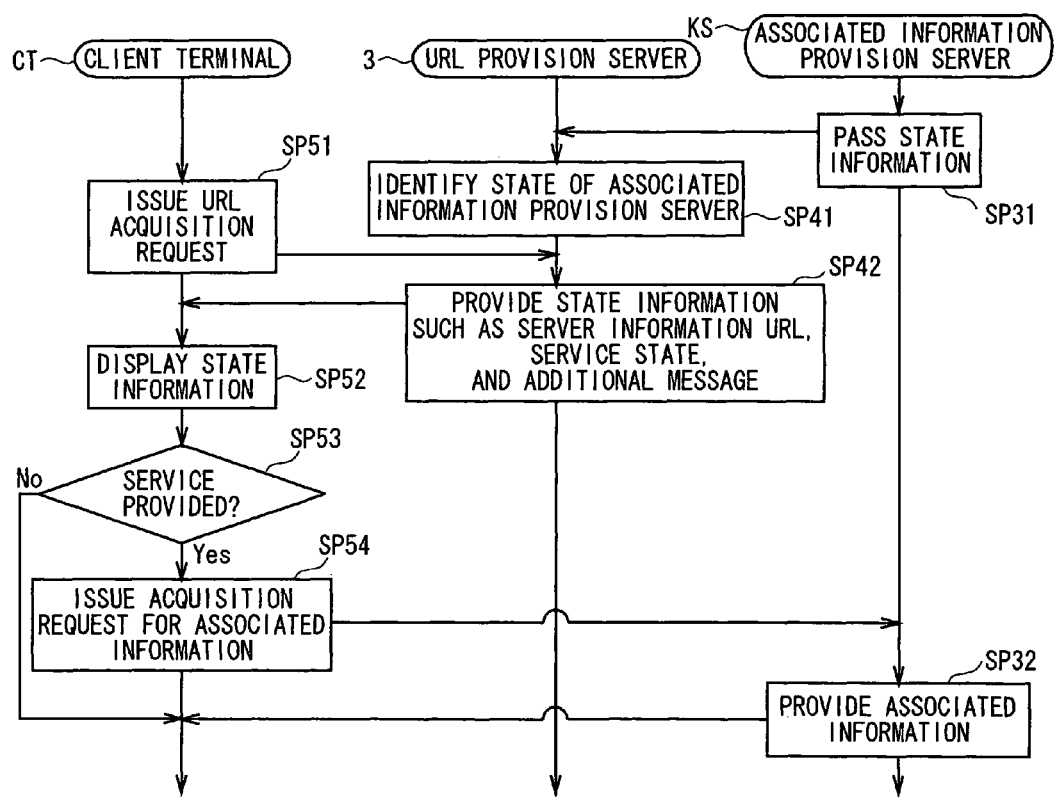
FIG. 8 is a schematic diagram showing a state information provision sequence not to determine whether or not a URL is available.

(1-8-1) State Information Provision Sequence not to Determine Availability of URL At step SP31 as shown in FIG. 8, the associated information provision server KS provides a homepage of the radio station RS via the network 2. The homepage may be serviced, may stop providing services, or may be subject to maintenance. In such cases, the associated information provision server KS passes these service states as state information to the URL provision server 3.

The associated information provision server KS can also pass the other state information such as information about the associated information provision server KS, a homepage URL of the radio station RS, and additional messages.

At step SP41, the URL provision server 3 identifies the state information provided from the associated information provision server KS, i.e., the information about the associated information provision server KS, the radio station RS's homepage URL, the homepage's service state, and additional messages. The URL provision server 3 stores the state information in the URL storage database 83 (FIG. 3) and then proceeds to the next step SP42.

At step SP51, the client terminal CT issues a URL acquisition request to the URL provision server 3 so as to access the radio station RS's homepage by sending a call sign to specify the radio station RS and user information (user ID, password, authentication session ID, and the like) to the URL provision server 3. The client terminal CT then proceeds to the next step SP52.

At step SP42, the URL provision server 3 specifies the radio station RS based on the call sign from the client terminal CT. The URL provision server 3 reads the state information corresponding to the specified radio station RS from the URL storage database 83. The URL provision server 3 provides the state information to the client terminal CT via the network 2. At this time, the URL provision server 3 authenticates the user information sent from the client terminal CT. This will be described in more detail with reference to a second embodiment later.

At step SP52, the client terminal CT acquires the state information from the URL provision server 3 and displays it on the display 17 to notify the user of the information provision service state. Further, the client terminal CT temporarily stores a state information provision URL of the state information in the RAM 20 and the HDD 21 with reference to the call sign. The client terminal CT then proceeds to the next step SP53.

Figure 9:
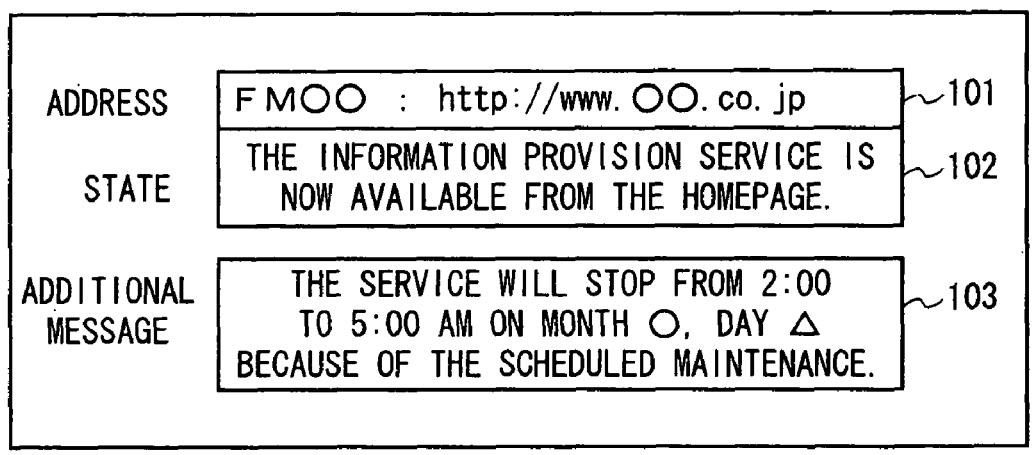
FIG. 9 is a schematic diagram showing a state information screen.

As shown in FIG. 9, for example, the client terminal CT displays a state information screen 100 on the display 17 to notify the user of information provision service states. More specifically, a URL display area 101 shows a URL to indicate the access destination of the radio station RS's homepage. A state information display area 102 shows availability of the information provision service using a message such as "The information provision service is now available from the homepage". An additional message display area 103 shows an additional message such as "The service will stop from 2:00 to 5:00 am on month ○, day ∆ because of the scheduled maintenance".

At step SP53, the client terminal CT determines whether or not the information provision service is performed based on the state information contents. Only if it is determined that the information provision service is performed, the client terminal CT proceeds to the next step SP54. When the state information contains a state information provision URL, for example, the client terminal CT determines that the information provision service is performed.

If it is determined at step SP54 that the information provision service is performed, the client terminal CT accesses the temporarily stored state information provision URL, i.e., the homepage of the information provision service. The client terminal CT issues a request to the associated information provision server KS to acquire the associated information about programs and musical compositions broadcast from the radio station RS.

At step SP32, the associated information provision server KS provides the associated information about programs and musical compositions in response to the acquisition request from the client terminal CT via the network 2. At this time, the associated information provision server KS performs authentication based on the user information sent from the client terminal CT. This will be described in more detail with reference to the second embodiment later.

(1-8-2) State Information Provision Sequence to Determine Availability of URL

Figure 10:
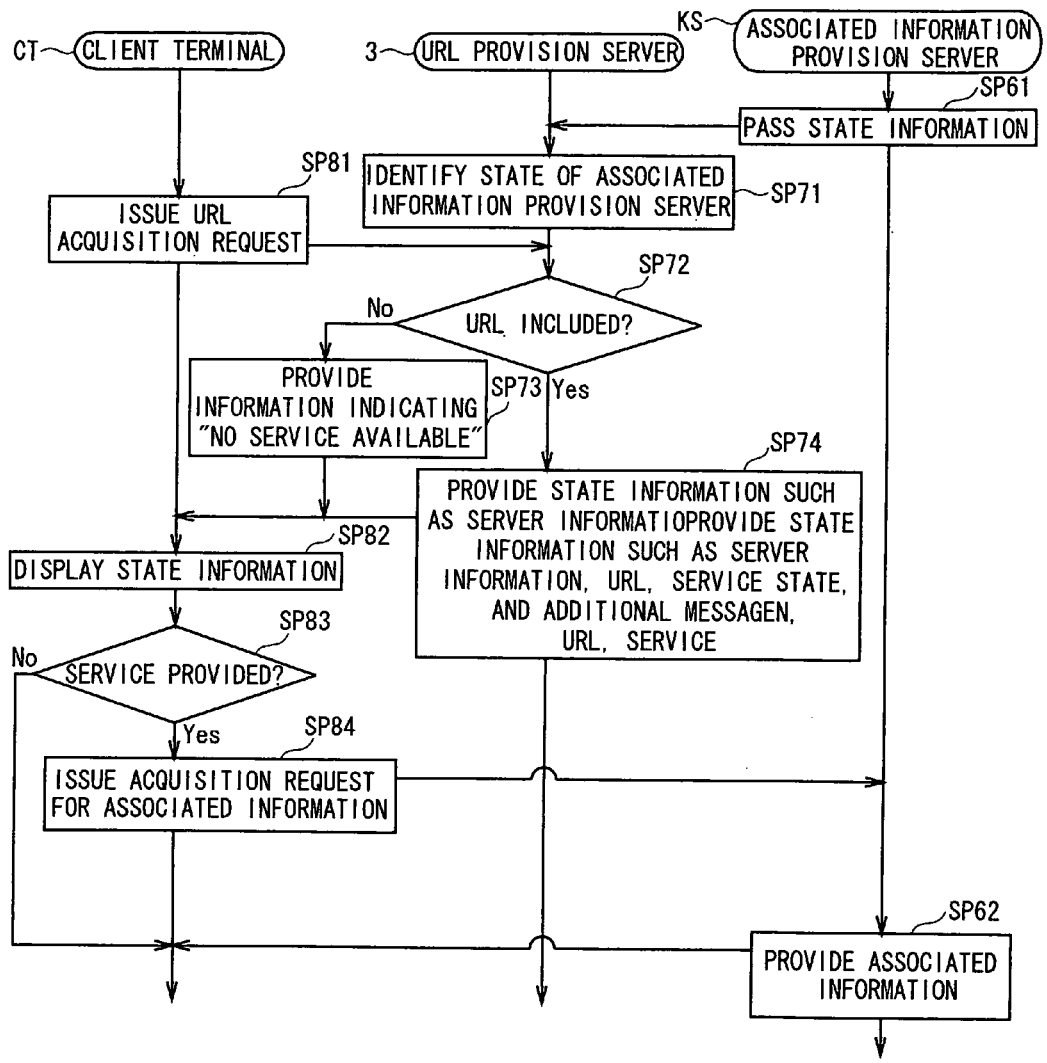
FIG. 10 is a schematic diagram showing a state information provision sequence to determine whether or not a URL is available.

At step SP61 as shown in FIG. 10 the associated information provision server KS functions like step SP31. The homepage may be serviced, may stop providing services, or may be subject to maintenance. In such cases, the associated information provision server KS passes these service states as the state information to the URL provision server 3.

The associated information provision server KS can also pass the other state information such as information about the associated information provision server KS, a homepage URL of the radio station RS, and additional messages.

At step SP71, the URL provision server 3 identifies the state information provided from the associated information provision server KS, i.e., information provision service states such as the information about the associated information provision server KS, the radio station RS's homepage URL, the homepage's service state, and additional messages. The URL provision server 3 stores the state information in the URL storage database 83 (FIG. 3) and then proceeds to the next step SP72.

At step SP81, the client terminal CT issues a URL acquisition request to the URL provision server 3 so as to access the radio station RS's homepage by sending a call sign to specify the radio station RS and user information (user ID, password, authentication session ID, and the like) to the URL provision server 3. The client terminal CT then proceeds to the next step SP82.

At step SP72, the URL provision server 3 specifies the radio station RS based on the call sign from the client terminal CT. The URL provision server 3 reads the state information corresponding to the specified radio station RS from the URL storage database 83. The URL provision server 3 determines whether or not the state information contains the URL of the homepage provided by the radio station RS. If the result is negative, the URL provision server 3 proceeds to the next step SP73. At this time, the URL provision server 3 authenticates the user information sent from the client terminal CT. This will be described in more detail with reference to the second embodiment later.

At step SP73, it is determined that no URL is contained in the state information. This indicates that the information provision service is currently unavailable and that no homepage exists. At this time, the URL provision server 3 adds to the state information a message indicating unavailability of the information provision service such as "The homepage presently provides no information provision service". The URL provision server 3 provides this state information to the client terminal CT.

If the result is affirmative at step SP72, however, the URL provision server 3 proceeds to the next step SP74. The URL provision server 3 provides the client terminal CT with the state information read from the URL storage database 83 via the network 2, and then proceeds to the next step SP75.

At step SP82, the client terminal CT acquires the state information from the URL provision server 3 and displays it on the display 17 to notify the user of the information provision service state. Further, the client terminal CT temporarily stores a state information provision URL of the state information in the RAM 20 and the HDD 21 with reference to the call sign. The client terminal CT then proceeds to the next step SP83.

Let us assume that there is provided the state information including the message indicating unavailability of the information provision service at step SP73. The client terminal CT displays the message such as "The homepage presently provides no information provision service" on the display 17.

On the other hand, let us assume that there is provided the state information including the URL at step SP74. The client terminal CT can display the state information screen 100 (FIG. 9) on the display 17 to visually notify the user of information provision service states in advance. More specifically, the state information screen 100 displays the URL to indicate the access destination of the radio station RS's homepage, availability of the information provision service from the homepage, and the additional message such as "The service will stop from 2:00 to 5:00 am on month ○, day △ because of the scheduled maintenance".

At step SP83, the client terminal CT determines whether or not the information provision service is performed based on the state information contents. Only if it is determined that the information provision service is performed, the client terminal CT proceeds to the next step SP84.

If it is determined at step SP84 that the information provision service is performed, the client terminal CT accesses the temporarily stored state information provision URL, i.e., the homepage of the information provision service. The client terminal CT issues a request to the associated information provision server KS to acquire the associated information about programs and musical compositions broadcast from the radio station RS.

At step SP62, the associated information provision server KS provides the associated information about programs and musical compositions in response to the acquisition request from the client terminal CT via the network 2. At this time, the associated information provision server KS performs authentication based on the user information sent from the client terminal CT. This will be described in more detail with reference to the second embodiment later.

Figure 11:
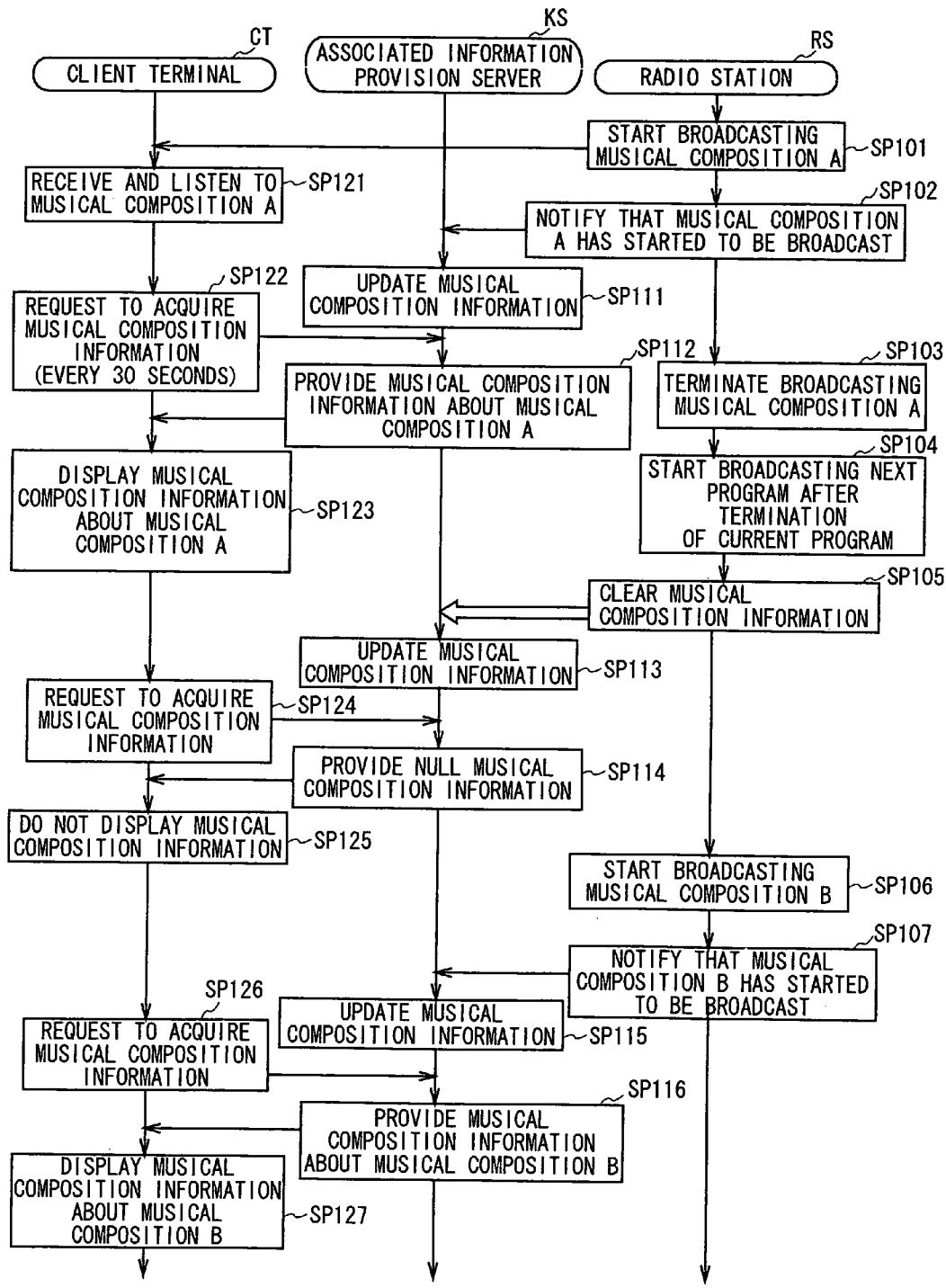
FIG. 11 is a schematic diagram showing a musical composition information provision sequence according to the present invention.

(1-9) Associated Information Provision Sequences (1-9-1) Musical Composition Information Provision Sequence Referring now to FIG. 11, the following describes a process in which the associated information provision server KS follows a specified information provision program and uses the homepage to provide the client terminal CT with the associated information comprising musical composition information about musical compositions broadcast by the radio station RS.

At step SP101, the radio station RS starts broadcasting musical composition A in the current program, and then proceeds to the next step SP102.

After starting broadcasting musical composition A at step SP102, the radio station RS notifies this state to the associated information provision server KS, and then proceeds to the next step SP103.

At step SP111, the associated information provision server KS uses the musical composition information database 93 (FIG. 4) to maintain a database of musical composition information associated with musical compositions. More specifically, the musical composition information includes titles and artist names concerning a plurality of types of musical compositions, names and numbers of CDs that record the corresponding musical compositions, and the like. It is necessary to provide the client terminal CT with musical composition information associated with musical composition A notified from the radio station RS. For this purpose, the associated information provision server KS updates the previous musical composition information to musical composition information associated with musical composition A, and then proceeds to the next step SP112.

At step SP121, the client terminal CT receives musical composition A broadcast by the radio station RS at step SP101 so that the user can listen to it. At step SP122, the client terminal CT performs polling by sending an acquisition request for the musical composition information to the associated information provision server KS at an interval of 30 seconds. The musical composition information includes titles and artist names associated with musical composition A. The client terminal CT then proceeds to the next step SP123.

The associated information provision server KS prepares the musical composition information to be provided in advance. At step SP112, in response to the acquisition request from the client terminal CT, the associated information provision server KS provides the client terminal CT with that prepared musical composition information about musical composition A via the network 2. The associated information provision server KS then proceeds to the next step SP113.

At step SP123, the client terminal CT uses the display 17 to display the musical composition information about musical composition A provided from the associated information provision server KS. Doing this allows the user to recognize the musical composition information such as titles and artist names about the musical composition A broadcast in the program. The client terminal CT then proceeds to the next step SP124.

At step SP103, the radio station RS stops broadcasting musical composition A. At step SP104, the radio station RS terminates the current program that broadcast musical composition A, starts broadcasting the next program, and then proceeds to the next step SP105.

At step SP105, the radio station RS starts the next broadcast and simultaneously sends a clear instruction to the associated information provision server KS. This aims at removing the musical composition information about musical composition A broadcast in the previous program from the other information maintained by the associated information provision server KS for provision. The radio station RS then proceeds to the next step SP106.

At step SP113, the associated information provision server KS removes the musical composition information about musical composition A from the other information maintained for provision. Doing so, the associated information provision server KS clears the musical composition information about musical composition A, and then proceeds to the next step SP114.

At step SP124, an interval of 30 seconds has passed since the most recent acquisition request. The client terminal CT re-issues an acquisition request for musical composition information to the associated information provision server KS.

At step SP114, the associated information provision server KS terminates the preceding program for broadcasting musical composition A and starts the next program. Almost at the same time, the associated information provision server KS clears the musical composition information about musical composition A broadcast in the preceding program from the other information to be provided. The associated information provision server KS provides the client terminal CT with empty musical composition information (null data) as the associated information, and then proceeds to the next step SP115.

At step SP125, the client terminal CT displays the null musical composition information on the display 17. That is to say, nothing is displayed thereon.

Since nothing is displayed on the display 17, the client terminal CT indirectly notifies the user that no musical composition is broadcast in the currently broadcast program.

At step SP106, the radio station RS starts broadcasting musical composition B in the current program. At step SP107, the radio station RS notifies the associated information provision server KS that musical composition B has started to be broadcast.

At step SP113, the associated information provision server KS already clears the musical composition information about musical composition A. Therefore, at step SP115, the associated information provision server KS reads the musical composition information about musical composition B from the musical composition information database 93. The associated information provision server KS updates the read musical composition information as one to be provided, and then proceeds to the next step SP116.

At step SP126, the client terminal CT re-issues an acquisition request for the musical composition information to the associated information provision server KS. At step SP116, the associated information provision server KS provides the client terminal CT with the updated musical composition information about musical composition B. At step SP127, the client terminal CT acquires the musical composition information about musical composition B and displays it on the display 17.

In this manner, the client terminal CT can acquire the musical composition information about musical composition A or B broadcast in the program from the associated information provision server KS while the radio station RS is broadcasting the program. It is possible to prevent the currently broadcast program and the musical composition information from being displayed with a time difference between them.

(1-9-2) Program Information Provision Sequence

Figure 12:
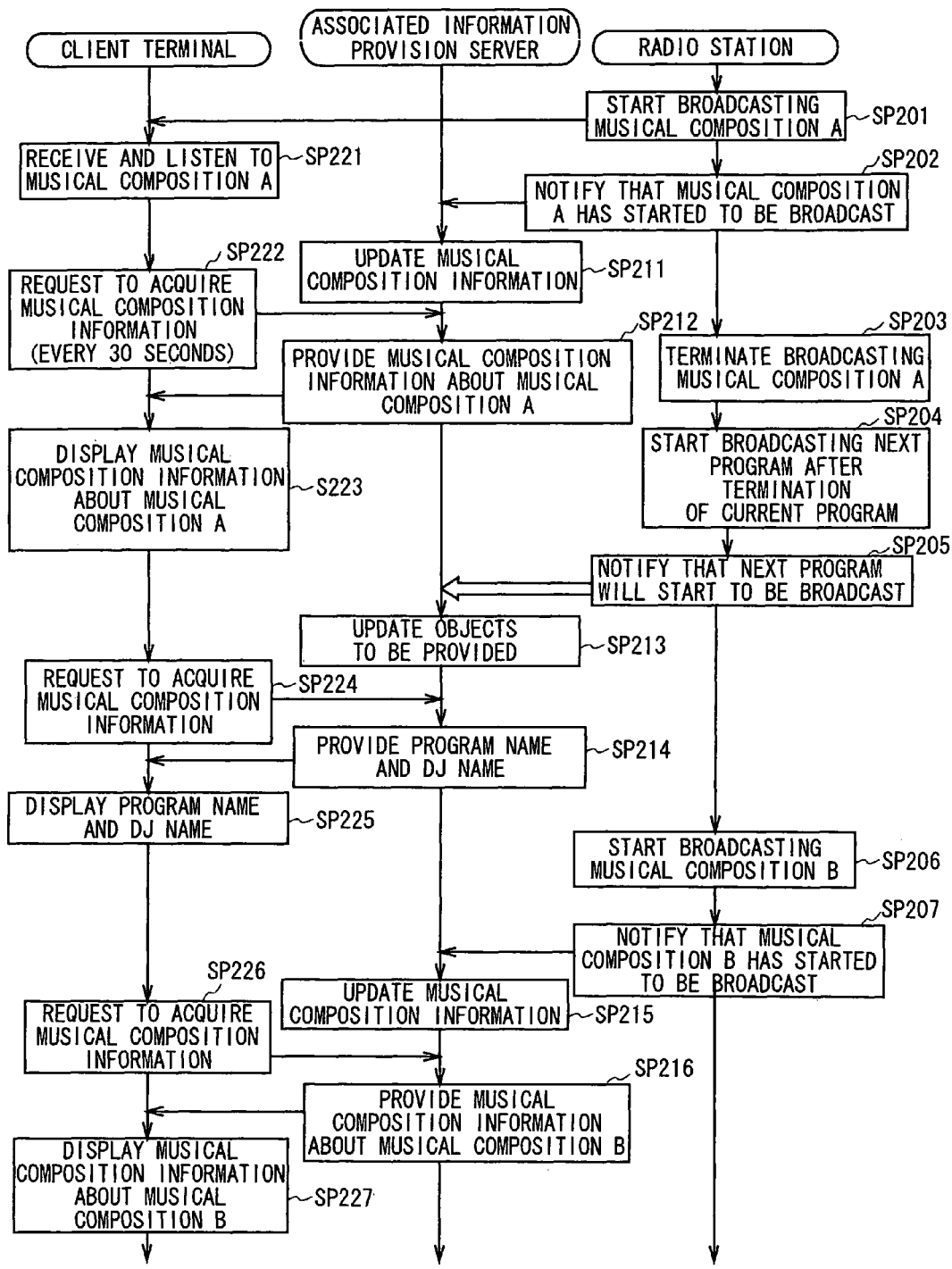
FIG. 12 is a schematic diagram showing a program information provision sequence according to the present invention.

With reference to FIG. 12, the following describes a process in which the associated information provision server KS uses a homepage to provide the client terminal CT with the associated information, i.e., information associated with programs broadcast from the radio station RS. In FIGS. 11 and 12, the associated information provision server KS authenticates user information sent from the client terminal CT in the manner similar to those described with reference to FIGS. 8 and 10. The specific authentication technique will be described in the second embodiment later.

At step SP201, the radio station RS starts broadcasting musical composition A in the current program, and then proceeds to the next step SP202.

After starting broadcasting musical composition A at step SP202, the radio station RS notifies this state to the associated information provision server KS, and then proceeds to the next step SP203.

At step SP211, the associated information provision server KS reads the musical composition information associated with musical composition A from the musical composition information database 93 (FIG. 4). The associated information provision server KS is prepared to provide the client terminal CT with the musical composition information associated with musical composition A notified from the radio station RS. The associated information provision server KS updates the previously maintained musical composition information to that associated with musical composition A, and then proceeds to the next step SP212.

At step SP221, the client terminal CT receives musical composition A broadcast by the radio station RS at step SP201 so that the user can listen to it. At step SP222, the client terminal CT performs polling by sending an acquisition request for the musical composition information to the associated information provision server KS at an interval of 30 seconds. The musical composition information includes titles and artist names associated with musical composition A. The client terminal CT then proceeds to the next step SP223.

The associated information provision server KS prepares the musical composition information to be provided in advance. At step SP212, in response to the acquisition request from the client terminal CT, the associated information provision server KS provides the client terminal CT with that prepared musical composition information about musical composition A via the network 2. The associated information provision server KS then proceeds to the next step SP213.

At step SP223, the client terminal CT uses the display 17 to display the musical composition information about musical composition A provided from the associated information provision server KS. Doing this allows the user to recognize the musical composition information such as titles and artist names about the musical composition A broadcast in the current program. The client terminal CT then proceeds to the next step SP224.

At step SP203, the radio station RS stops broadcasting musical composition A. At step SP204, the radio station RS terminates the current program that broadcast musical composition A, starts broadcasting the next program, and then proceeds to the next step SP205.

At step SP205, the radio station RS starts the next broadcast and simultaneously notifies the associated information provision server KS that the next program has started to be broadcast. The radio station RS proceeds to the next step SP206.

The associated information provision server KS uses the musical composition information database 93 to store a plurality of musical composition information. Likewise, the associated information provision server KS uses the program information database 94 to store program information associated with a plurality of programs such as program names, DJ names, and the like. At step SP213, the associated information provision server KS reads the program information associated with the next program such as a program name, a DJ name, and the like from the program information database 94. The associated information provision server KS then removes the musical composition information about musical composition A from the information to be provided. The associated information provision server KS updates the program information about the next program as information to be provided next, and then proceeds to the next step SP214.

At step SP224, an interval of 30 seconds has passed since the most recent acquisition request. The client terminal CT re-issues an acquisition request for musical composition information to the associated information provision server KS.

At step SP214, the associated information provision server KS maintains the program information associated with the next program as information to be provided next. In addition, the next program does not broadcast musical composition B yet. The associated information provision server KS provides the client terminal CT the program information about the next program as the associated information, and then proceeds to the next step SP215.

At step SP225, the client terminal CT uses the display 17 to display the program information associated with the next program such as the program name, the DJ name, and the like, and then proceeds to the next step SP226.

Though the radio station RS already starts broadcasting the next program, the program does not start broadcasting the musical composition yet. The client terminal CT displays the next program's program information provided from the associated information provision server KS until the program starts broadcasting the musical composition.

At step SP206, the radio station RS starts broadcasting musical composition B in the current program (next program). At step SP207, the radio station RS notifies the associated information provision server KS that musical composition B has started to be broadcast.

At step SP215, the associated information provision server KS reads the musical composition information about musical composition B from the musical composition information database 93. The associated information provision server KS newly updates the musical composition information about musical composition B as one to be provided, and then proceeds to the next step SP216.

At step SP226, the client terminal CT re-issues an acquisition request for musical composition information to the associated information provision server KS at a polling interval, and then proceeds to the next step SP227.

At step SP216, the associated information provision server KS provides the client terminal CT with the updated musical composition information about musical composition B. At step SP227, the client terminal CT acquires the musical composition information about musical composition B and displays it on the display 17.

The client terminal CT may issue an acquisition request for the musical composition information when the current program changes to the next one which broadcasts no musical composition yet. In such case, the client terminal CT can acquire the program information about the next program instead of the musical composition information and display the acquired program information on the display 17. This prevents the display 17 from displaying nothing despite acquisition request for the musical composition information and notifies useful program information to the user who listens to the program instead of the musical composition information.

(1-10) Operations and Effects

According to the above-mentioned configuration, the URL provision server 3 of the information provision system 1 uses the URL storage database 83 to store the state information supplied from the associated information provision server KS, i.e., information about the associated information provision server KS, the radio station RS's homepage URL, service states of the homepage, additional messages, and the like.

The URL provision server 3 specifies the radio station RS based on the call sign received from the client terminal CT. The URL provision server 3 reads the state information corresponding to the specified radio station RS from the URL storage database 83 and provides the state information to the client terminal CT.

At this time, a URL may be contained in the state information corresponding to the radio station RS specified by the call sign. In this case, the URL provision server 3 can determine that the information provision service is available from the homepage provided by the radio station RS. In this case, the client terminal CT is provided with not only the homepage's URL, but also information about the associated information provision server KS, service states of the homepage, additional messages, and the like.

The client terminal CT can use the display 17 to display the URL of the homepage provided by the radio station RS corresponding to the call sign and notify the user of the access destination. In addition, the client terminal CT can allow the user to explicitly confirm the homepage's service state prior to access to the URL.

This is useful when no information provision service is available via the homepage provided by the radio station RS corresponding to the call sign. The user can beforehand confirm that it is impossible to issue acquisition request for the musical composition information to the associated information provision server KS via the homepage. This makes it possible to eliminate unnecessary operations.

When no URL is contained in the state information corresponding to the radio station RS specified by the call sign, the URL provision server 3 determines that no information provision service is available from the homepage provided by the radio station RS. The URL provision server 3 provides the client terminal CT with the state information by adding the message such as "The homepage presently provides no information provision service" to indicate unavailability of the information provision service.

Based on the state information acquired from the URL provision server 3, the client terminal CT uses the display 17 to display the message "The homepage presently provides no information provision service". The user can avoid unnecessary operations such as searching for the URL of the homepage provided by the radio station RS.

According to the above-mentioned configuration, the state information corresponding to the radio station RS specified by the call sign may contain the URL of the homepage provided by the radio station RS. In such case, the URL provision server 3 of the information provision system 1 determines that at least the information provision service is provided via the homepage. The URL provision server 3 provides the client terminal CT with that URL as well as the information about the associated information provision server KS, the homepage's service state, the additional message, and the like. In this manner, the user can recognize not only the homepage's URL via the client terminal CT, but also the homepage's service state prior to access.

(2) Second Embodiment

As the second embodiment, the following describes authentication methods between the client terminal 2 and the URL provision server 3 and between the client terminal 2 and the associated information provision server KS according to the first embodiment as mentioned above.

The method of providing the associated information according to the second embodiment is the same as that for the first embodiment and the description is omitted. A client terminal 1002 in FIG. 13 according to the second embodiment corresponds to the client terminal CT in FIG. 1 according to the above-mentioned first embodiment. A portal server 1003 in FIG. 14 functions as an authentication server and corresponds to the URL provision server 3 in FIG. 1. A radio broadcast information delivery server 1006 in FIG. 15 corresponds to the associated information provision server KS in FIG. 1.

(2-1) Functional Circuit Block Configuration of the Client Terminal

Figure 13:
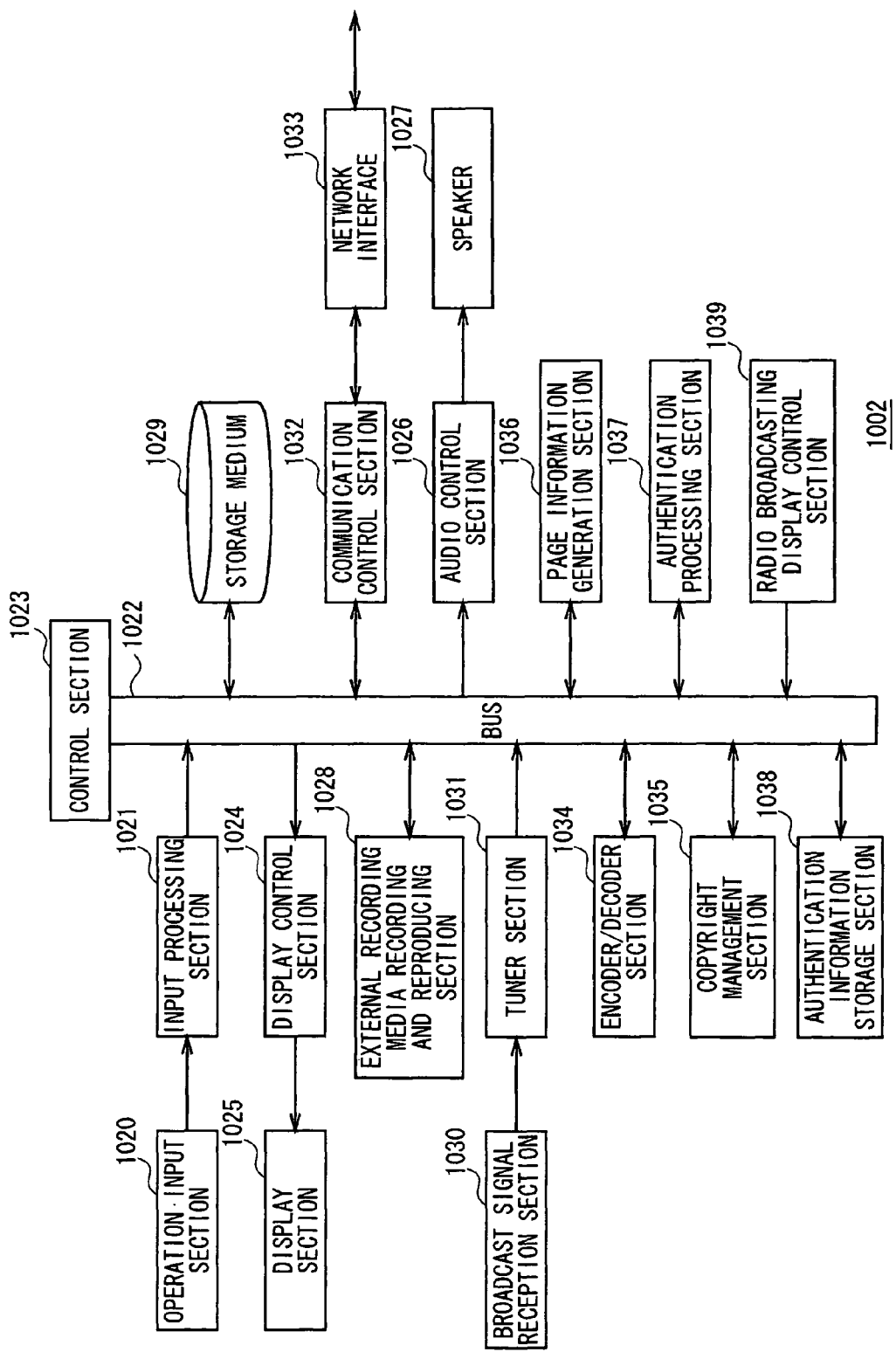
FIG. 13 is a block diagram showing the hardware configuration using functional circuit blocks of the client terminal according to a second embodiment of the present invention.

The following describes the hardware configuration of the client terminal 1002 using functional circuit blocks. As shown in FIG. 13, the client terminal 1002 has an operation input section 1020 comprising various operation buttons provided on the surface of the client terminal cabinet or a remote controller (not shown). When a user operates the operation input section 1020, it detects the user operation and sends an input operation signal corresponding to the operation to an input processing section 1021.

The input processing section 1021 is supplied with the input operation signal from the operation input section 1020, converts the signal into a specific operation command, and sends it to a control section 1023 via a bus 1022.

The control section 1023 is supplied with operation commands and control signals from circuits connected to the bus 1022. Based on these operation commands and control signals, the control section 1023 controls operations of these circuits.

A display control section 1024 is supplied with video data via the bus 1022 and applies digital-analog conversion to the video data to generate an analog video signal. The display control section 1024 sends the resulting analog video signal to a display section 1025.

The display section 1025 represents a display device such as a liquid crystal display and may be directly attached to the surface of the main unit cabinet or may be externally connected.

The display section 1025 is supplied with processing results from the control section 1023 and various video data as an analog video signal via the display control section 1024. The display section 1025 displays a video based on the analog video signal.

An audio control section 1026 applies digital-analog conversion to audio data supplied via the bus 1022 and sends a resulting analog audio signal to a speaker 1027. The speaker 1027 outputs audio based on the analog audio signal supplied from the audio control section 1026.

An external recording media recording and reproducing section 1028 reads and reproduces content data from external recording media such as CDs and Memory Stick (registered trademark), and records targeted content data on the external recording media. Memory Stick comprises flash memory enclosed in a packaging case.

The external recording media recording and reproducing section 1028 reads video data as content data from an external recording medium and supplies the read video data to the display control section 1024 via the bus 1022.

The display control section 1024 is supplied with the video data read as content data from the external recording medium by the external recording media recording and reproducing section 1028. The display control section 1024 then converts the video data into an analog video signal and sends it to the display section 1025.

The external recording media recording and reproducing section 1028 reads audio data as content data from the external recording medium and supplies the read audio data to the audio control section 1026 via the bus 1022.

When the external recording media recording and reproducing section 1028 reads audio data as content data from the external recording medium, the audio control section 1026 converts the audio data into an analog audio signal and supplies it to the speaker 1027.

When the external recording media recording and reproducing section 1028 reads the content data from the external recording medium, the control section 1023 sends that content data to a storage medium 1029 in the client terminal 1002 via the bus 1022. The control section 1023 can store the content data in the storage medium 1029. Storing content data in the storage medium 1029 is also referred to as ripping.

When reading video data such as image data as content data from the storage medium 1029, the control section 1023 supplies the read video data to the display control section 1024 via the bus 1022.

When reading audio data as content data from the storage medium 1029, the control section 1023 supplies the read audio data to the audio control section 1026 via the bus 1022.

In addition, the control section 1023 can read music data from the storage medium 1029 and transfers it to the external recording media recording and reproducing section 1028 which can then record the music data on the external recording medium.

A broadcast signal reception section 1030 receives radio broadcasting waves transmitted from radio stations and supplies them to the tuner section 1031.

As mentioned above, the broadcast signal reception section 1030 receives radio broadcasting waves. Under the control of the control section 1023, the tuner section 1031 extracts such radio broadcasting signals from the received radio broadcasting waves as to have a broadcasting frequency corresponding to the radio station specified from the operation input section 1020, for example. The tuner section 1031 then applies specified reception processing to the extracted signals. The tuner section 1031 sends resulting audio data to the audio control section 1026 via the bus 1022.

The audio control section 1026 converts the audio data supplied from the tuner section 1031 into an analog audio signal and sends this signal to the speaker 1027. The speaker 1027 outputs the audio of the radio program broadcast from the radio station. In this manner, the user can listen to the radio program's audio.

The control section 1023 can record audio of radio programs. To do this, the control section 1023 sends audio data acquired by the tuner section 1031 to the storage medium 1029 for storage.

Further, the control section 1023 can connect to a specified network via a communication control section 1032 and a network interface 1033 in order. Consequently, the control section 1023 can access the portal server 1003, a service provision server (e.g., the radio broadcast information delivery server 1006 to be described later), and the like on the network. In this manner, the client terminal can interchange various information and data with the portal server 1003, the service provision server, and the like.

Compressed and encoded content data is received from the network via the network interface 1033 and the communication control section 1032 in order. Alternatively, compressed and encoded content data is read from the storage medium 1029 and external recording media. An encoder/decoder section 1034 decodes such content data and sends it to the audio control section 1026.

Further, the encoder/decoder section 1034 compresses and encodes neither compressed nor encoded content data read from external recording media or audio data supplied from the tuner section 1031. The encoder/decoder section 1034 sends the compressed and encoded content data to the storage medium 1029.

Under the control of the control section 1023, content data is compressed and encoded in the encoder/decoder section 1034 and is stored in the storage medium 1029.

A copyright management section 1035 generates copyright management information corresponding to content data that is downloaded from the network via the network interface 1033 and the communication control section 1032 in order or is read from external recording media by the external recording media recording and reproducing section 1028.

Under the control of the control section 1023, the copyright management information generated in the copyright management section 1035 is associated with the content data and is registered to the recording medium 1029.

The copyright management section 1035 is used to check out content data associated with the copyright management information from the storage medium 1029 to a specific external recording medium and to check in the content data associated with the copyright management information from the specific external recording medium to the storage medium 1029. The copyright management section 1035 appropriately updates contents of the copyright management information corresponding to the content data to protect the copyright of the content data.

The client terminal receives XML (eXtensible Markup Language) or HTML (Hyper Text Markup Language) files from the network via the network interface 1033 and the communication control section 1032 in order. A page information generation section 1036 interprets page information of these files and generates video data to be displayed on the display section 1025. The page information generation section 1036 then sends the generated video data to the display control section 1024.

An authentication processing section 1037 performs authentication processes such as sending authentication information to the portal server 1003 and the service provision server on the network connected via the communication control section 1032 and the network interface 1033 in order.

An authentication information storage section 1038 stores authentication information needed for the authentication processing section 1037 to access the portal server 1003, the service provision server, and the like.

A radio broadcasting display control section 1039 sends a request signal to the radio broadcast information delivery server 1006 via the communication control section 1032 and the network interface 1033 in order. This request signal is used to request information about the radio broadcast currently received by the user for listening. The radio broadcast information delivery server 1006 is one of service provision servers corresponding to the radio station that carries the radio broadcast being received.

As a result, the radio broadcasting display control section 1039 receives the radio broadcast information received from the networked radio broadcast information delivery server 1006 via the network interface 1033 and the communication control section 1032 in order. In addition, the radio broadcasting display control section 1039 sends the received radio broadcast information to the display control section 1024. This allows the display section 1025 to display the radio broadcast information (equivalent to the associated information in the first embodiment) comprising a name of the currently received radio program, a title and an artist name of the currently received musical composition, and the like.

(2-2) Portal Server Configuration

Figure 14:
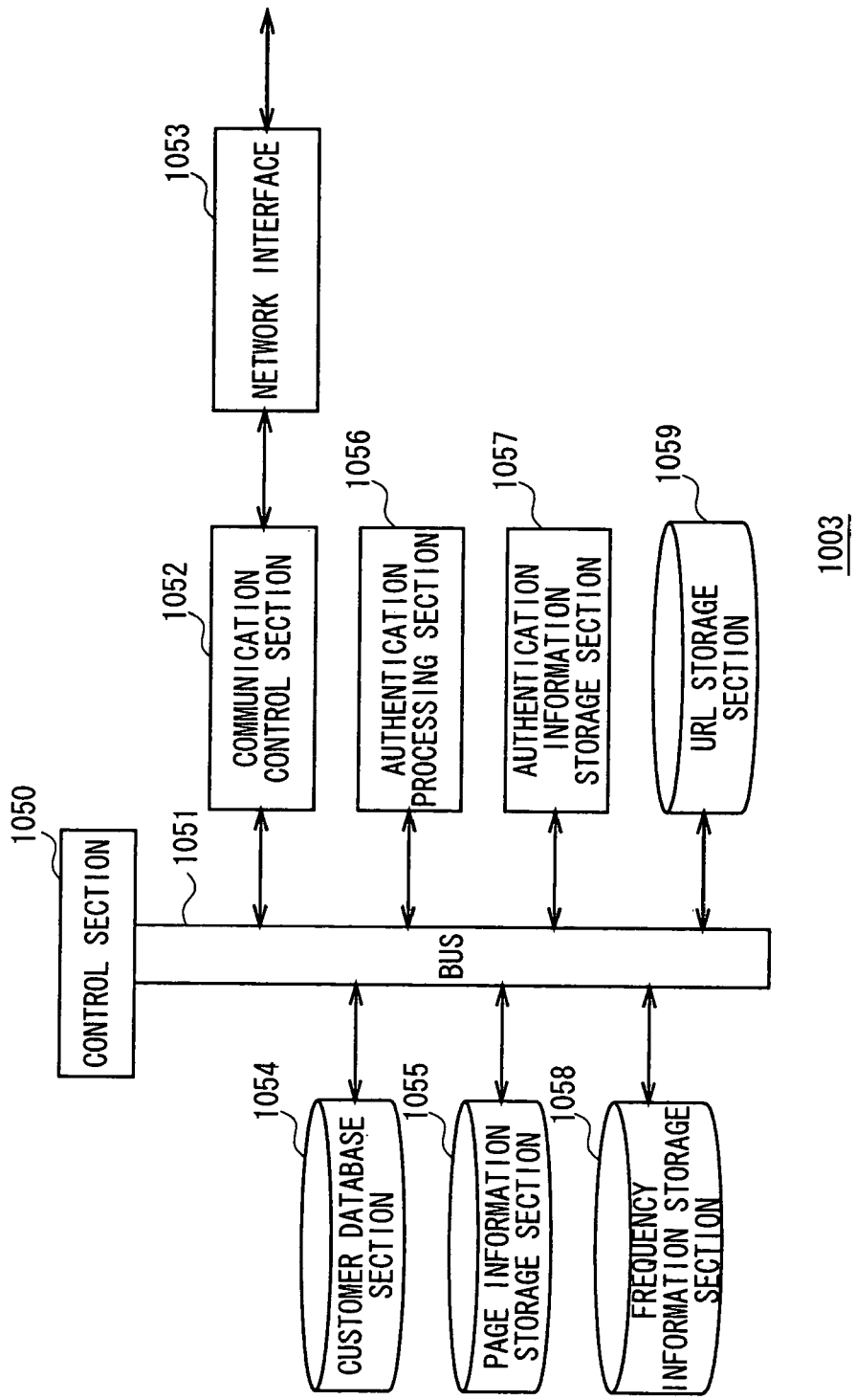
FIG. 14 is a block diagram showing the hardware configuration using functional circuit blocks of a portal server.

With reference to FIG. 14, the following describes the hardware configuration of the portal server 1003 using functional circuit blocks. A control section 1050 in the portal server 1003 controls operations of circuits connected via a bus 1051.

Under the control of the control section 1050, a communication control section 1052 interchanges various information with the client terminal 1002, the service provision server, and the like via a network interface 1053.

A customer database section 1054 registers customer information comprising user ID (identification) information and associated password information of a user who has completed a contract with a service provider of the information provision system.

A page information storage section 1055 stores page information and the like managed by the information provision system's service provider.

The page information is written in languages such as XML and includes URL (Uniform Resource Locator) information to access the service provision server and the like.

An authentication processing section 1056 receives the user ID information and the password information sent from the client terminal 1002 via the network interface 1053 and the communication control section 1052 in order. The authentication processing section 1056 then performs a user authentication process to confirm whether or not the customer database section 1054 stores the received user ID information and password information as the customer information.

Upon completion of the user authentication process, the authentication processing section 1056 issues portal authentication result information (authentication session ID information to be described later) indicating the result of the user authentication process. The authentication processing section 1056 temporarily stores the issued portal authentication result information in the authentication information storage section 1057.

Let us assume that the user is authenticated to be a registered user as a result of the user authentication process by the authentication processing section 1056. In this case, the control section 1050 sends page information about a contractor page stored in the page information storage section 1055 as well as the portal authentication result information to the client terminal 1002 via the communication control section 1052 and the network interface 1053 in order.

Next, let us assume that the user is not authenticated to be a registered user as a result of the user authentication process by the authentication processing section 1056. In this case, the control section 1050 may be configured to send authentication error information as well as unsuccessful authentication notification page information indicating the unsuccessful authentication to the client terminal 1002 via the communication control section 1052 and the network interface 1053 in order. The unsuccessful authentication notification page information is stored in the page information storage section 1055.

As a result of performing authentication processes for the user from the service provision server and the like, the authentication processing section 1056 receives portal authentication result information (authentication ticket to be described later) via the network interface 1053 and the communication control section 1052 in order. The portal authentication result information is acquired and sent from the user's client terminal 1002. Then, the authentication processing section 1056 compares the received portal authentication result information with the portal authentication result information that is temporarily stored in the authentication information storage section 1057 corresponding to the user.

The authentication processing section 1056 performs a confirmation process as an authentication process for the portal authentication result information received from the service provision server and the like. Specifically, the authentication processing section 1056 confirms whether or not the portal authentication result information is authenticated. The authentication processing section 1056 then returns confirmation result information indicating a confirmation result to the service provision server and the like via the communication control section 1052 and the network interface 1053 in order.

A frequency information storage section 1058 stores the following associated with each other: an area code such as a postal guide number capable of specifying an area; frequency information indicating broadcast frequencies for radio broadcasts receivable in the area indicated by the area code; a name of a radio station (hereafter referred to as a radio station name) to broadcast the radio broadcast; and a call sign as identification information unique to each radio station.

A URL storage section 1059 stores the following associated with each other: a call sign for radio broadcast corresponding to each radio station; and URL information capable of acquiring radio broadcast information (hereafter referred to specifically as now-on-air information). This information concerns a currently broadcast radio program provided by the radio station corresponding to the call sign and comprises a name of the radio program, a tile of the musical composition currently broadcast in the radio program, and the like.

Figure 15:
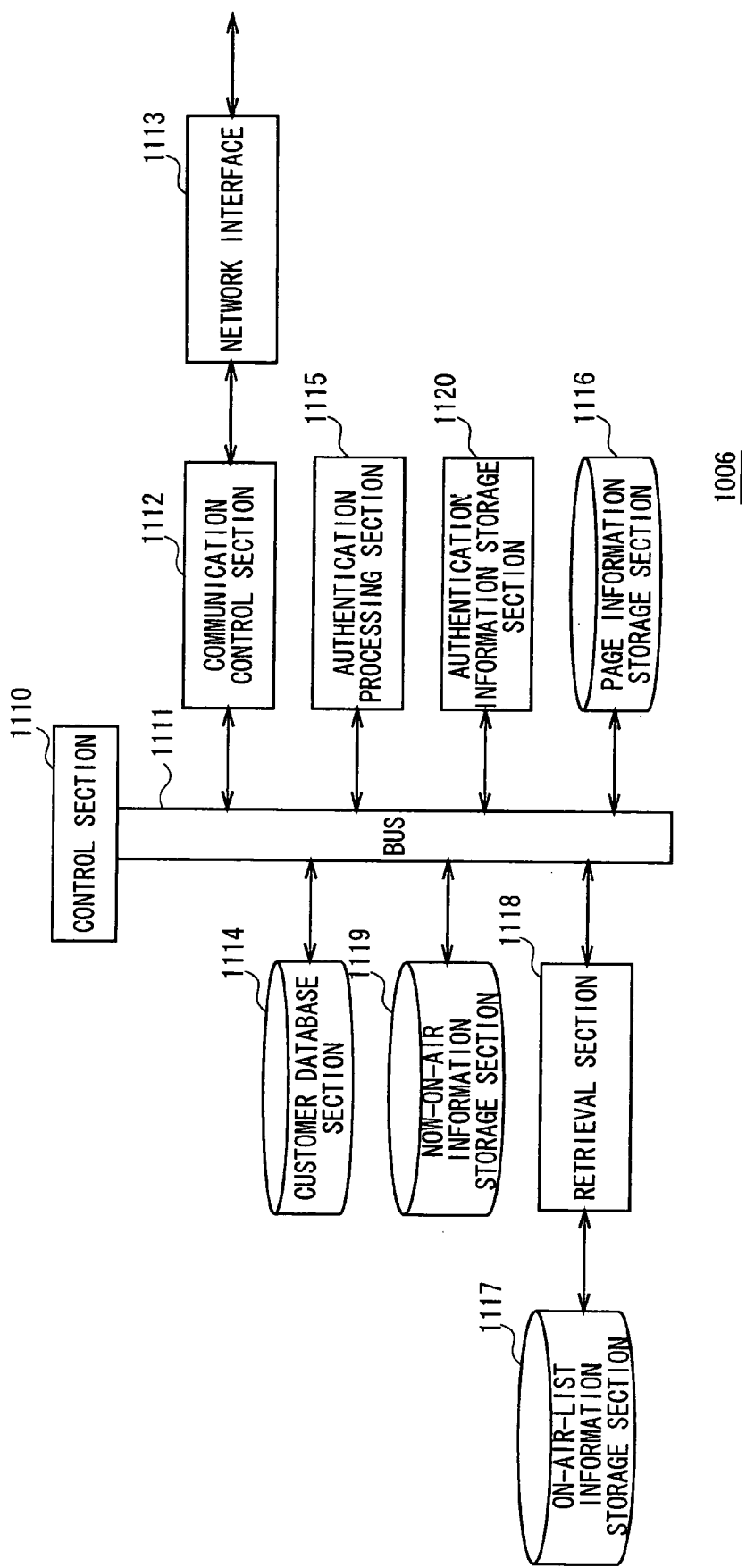
FIG. 15 is a block diagram showing the hardware configuration using functional circuit blocks of radio broadcast information delivery server.

(2-3) Functional Circuit Block Configuration of the Radio Broadcast Information Delivery Server With reference to FIG. 15, the following describes the hardware configuration of the radio broadcast information delivery server 1006, i.e., one of service provision servers, using functional circuit blocks. A control section 1110 in the radio broadcast information delivery server 1006 controls operations of circuits connected via a bus 1111.

Under the control of the control section 1110, a communication control section 1112 interchanges various information with the client terminal 1002, the portal server 1003, and the like via a network interface 1113.

A customer database section 1114 registers customer information comprising user ID information and associated password information of a user who has completed a contract with a service provider of the radio broadcast information delivery server 1006. The authentication processing section 1115 may have a function to authenticate users based on the portal authentication result information that is sent from the client terminal 1002 and is issued by the portal server 1003. In such case, the customer database section 1114 may not be provided.

There is provided radio broadcast information called on-air-list information. This information is managed by the radio broadcast information delivery server 1006 and concerns the radio program already broadcast by the radio station corresponding to the radio broadcast information delivery server 1006. A page information storage section 1116 stores, for example, page information about an on-air-list information delivery page used to acquire the on-air-list information.

Page information about the on-air-list information delivery page is written in a language such as XML. There is provided an input box or the like that allows a user of the client terminal 1002 to enter retrieval keys for intended on-air-list information. For example, retrieval keys include broadcast date information, names, and the like of radio programs.

An on-air-list information storage section 1117 stores the on-air-list information generated in a list format. The on-air-list information includes: the name of the radio program already broadcasted from the radio station corresponding to the radio broadcast information delivery server 1006; program broadcast start time, program broadcast end time, and the like; and title and artist name of a musical composition broadcasted in the radio program, musical composition broadcast start time, and the like.

The control section 1110 receives a page information acquisition request signal to request the page information about the on-air-list information delivery page from the client terminal 1002 via the network interface 1113 and the communication control section 1112 in order. Corresponding to the received page information acquisition request signal, the control section 1110 sends the page information about the on-air-list information delivery page stored in the page information storage section 1116 to the client terminal 1002 via the communication control section 1112 and the network interface 1113 in order.

After the retrieval key is entered for the page information about the on-air-list information delivery page from the client terminal 1002, the retrieval section 1118 stores the retrieval key to retrieve the intended on-air-list information. When an on-air-list information request signal is transmitted to request download of the on-air-list information, the retrieval section 1118 receives the on-air-list information request signal via the network interface 1113 and the communication control section 1112 in order. The retrieval section 1118 then extracts the retrieval key from the received on-air-list information request signal.

Based on the retrieval key, the retrieval section 1118 searches the entire on-air-list information in the on-air-list information storage section 1117 for the targeted on-air-list information within a specified range corresponding to the retrieval condition indicated by the retrieval key.

As a result, the control section 1110 sends the retrieved targeted on-air-list information to the client terminal 1002 via the communication control section 1112 and the network interface 1113 in order.

A now-on-air information storage section 1119 stores radio broadcast information called now-on-air information. This information comprises: program name, program broadcast start time, and program broadcast end time of a radio program currently broadcasted from the radio station corresponding to the radio broadcast information delivery server 1006; and title, artist name, musical composition broadcast start time, and the like of a musical composition currently broadcasted in the radio program.

The client terminal 1002 sends not only a now-on-air information request signal to request to acquire the now-on-air information, but also user ID information and password information of the user who uses the client terminal 1002. The authentication processing section 1115 receives these pieces of information via the network interface 1113 and the communication control section 1112 in order. The authentication processing section 1115 then performs the user authentication process to confirm whether or not the received user ID information and password information are registered as the customer information in the customer database section 1114.

Further, the authentication processing section 1115 uses a user authentication technique different from the user authentication process that uses the user ID information and the password information. That is to say, the client terminal 1002 sends the portal authentication result information (authentication ticket to be described later) that is issued from the portal server 1003. The authentication processing section 1115 receives this information via the network interface 1113 and the communication control section 1112 in order. The authentication processing section 1115 then sends the received portal authentication result information to the portal server 1003 via the communication control section 1112 and the network interface 1113 in order.

After the authentication processing section 1115 sends the portal authentication result information to the portal server 1003, the portal server 1003 returns confirmation result information as a result of performing the authentication process (i.e., the above-mentioned confirmation process) corresponding to the portal authentication result information. The authentication processing section 1115 receives the confirmation result information via the network interface 1113 and the communication control section 1112 in order. Based on the received confirmation result information, the authentication processing section 1115 determines whether or not the user is a registered user who has completed a contract with the service provider of a music related service provision system 1000.

After terminating the user authentication process, the authentication processing section 1115 issues server authentication result information (service session ID information to be described later) indicating the result of the user authentication process.

Let us assume that the user is authenticated to be a registered user as a result of the user authentication process performed by the authentication processing section 1115. In this case, the control section 1110 sends the now-on-air information stored in the now-on-air information storage section 1119 as well as the server authentication result information to the client terminal 1002 via the communication control section 1112 and the network interface 1113 in order.

By contrast, let us assume that the user is not authenticated to be a registered user as a result of the user authentication process performed by the authentication processing section 1115. In this case, the control section 1110 sends authentication error information as well as unsuccessful authentication notification page information to the client terminal 1002 via the communication control section 1112 and the network interface 1113 in order. The unsuccessful authentication notification page information is stored in the page information storage section 1116 and indicates unsuccessful authentication.

In this manner, the control section 1110 functions in response to a request to acquire the now-on-air information from the user as follows. When the user is authenticated to be a registered user, the control section 1110 provides the now-on-air information. When the user is not authenticated to be a registered user, however, the control section 1110 prevents the user from receiving radio broadcast information delivery services provided by the radio broadcast information delivery server 1006 such as the now-on-air information delivery service.

The authentication information storage section 1120 temporarily stores the server authentication result information issued from the authentication processing section 1115. The authentication information storage section 1120 also stores various authentication information needed when the authentication processing section 1115 authenticates a user of the client terminal 1002.

(2-4) Process Overview of the Servers

With reference to sequence charts in FIGS. 16 through 19, the following outlines processes performed between the client terminal 1002 and the portal server 1003 and processes performed between the client terminal 1002 and each service provision server.

(2-4-1) User Authentication Process between the Client Terminal 1002 and the Portal Server 1003

Figure 16:
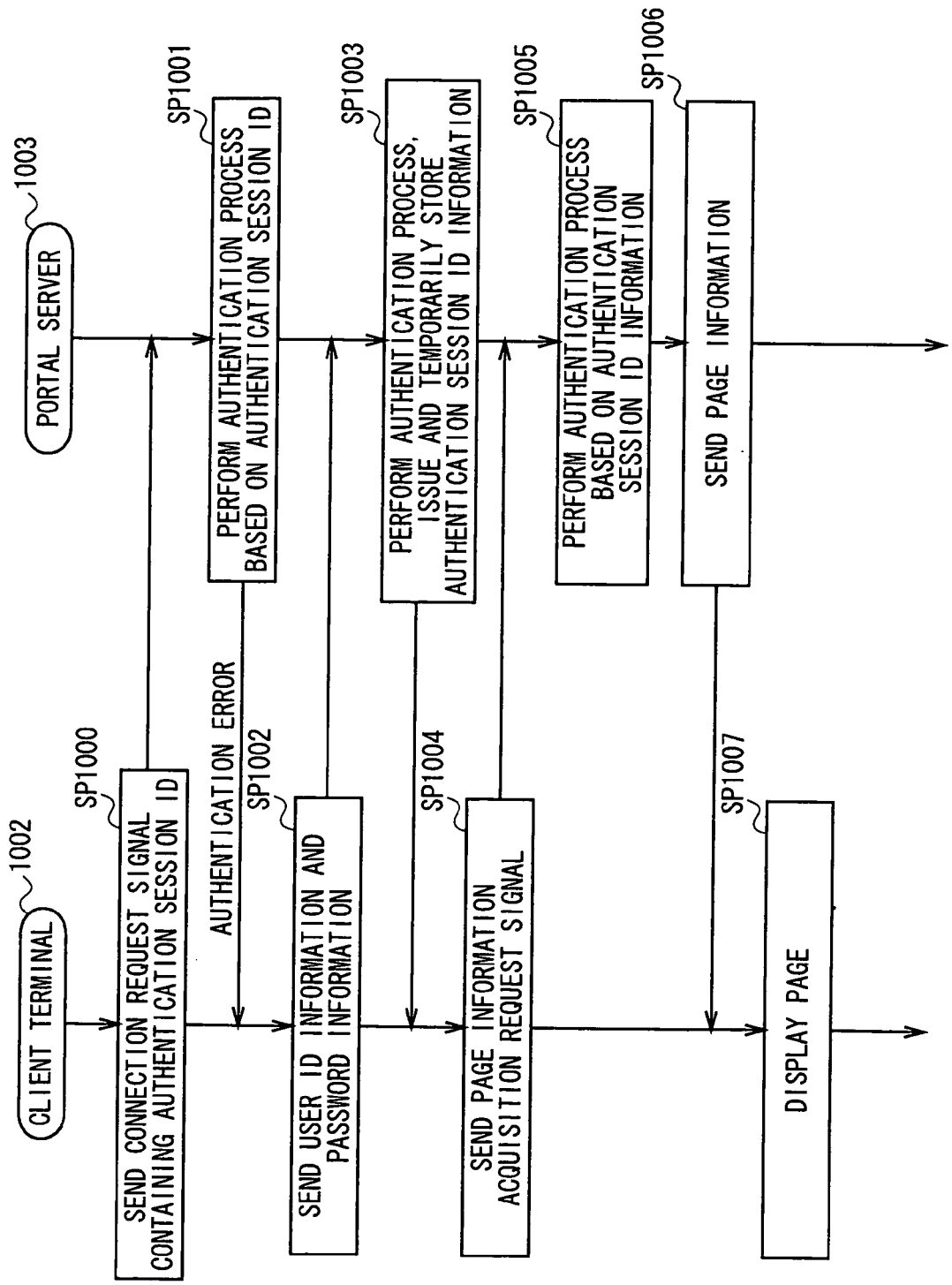
FIG. 16 is a sequence chart showing a user authentication process between the client terminal and the portal server.

With reference to FIG. 16, the following describes a user authentication process performed between the client terminal 1002 and the portal server 1003.

The control section 1023 corresponds to the client terminal 1002 for the user who contracts with the information provision system's service provider. For example, the user performs an operation to turn on the client terminal 1002. Alternatively, the user presses a specific operation button on the operation input section 1020. In response to such operation, the operation input section 1020 recognizes an operation input signal. The input processing section 1021 converts this signal into an operation command. The control section 1023 is supplied with this command and starts an authentication request process.

After starting the authentication request process, the control section 1023, at step SP1000, generates a connection request signal containing the authentication session ID information and the like temporarily stored in the authentication information storage section 1038. The control section 1023 sends the generated connection request signal to the portal server 1003 via the communication control section 1032 and the network interface 1033 in order.

The client terminal 1002 establishes a communication connection with the portal server 1003 to perform various processes such as the user authentication process. Each time this communication connection is established, the portal server 1003 issues the authentication session ID information as identification information to identify respective communication connection states (i.e., sessions).

For the use with the user authentication process and the like, the authentication session ID information is assigned with a specified valid period (e.g., approximately one minute) with reference to the time of issuance from the portal server 1003.

The client terminal 1002 acquires the authentication session ID information from the portal server 1003. There may be a case where the client terminal 1002 cannot supply the authentication session ID information to the portal server 1003 within the valid period. In such case, the portal server 1003 determines cancellation of the communication connection state specified by the authentication session ID information.

In this manner, the portal server 1003 prevents the previously issued authentication session ID information from being falsely used by a user not contracted with the service provider of the music related service provision system 1.

The authentication information storage section 1038 temporarily stores the authentication session ID information. This authentication session ID information was issued by the portal server 1003 that established communication connection with the client terminal 1002 to perform the user authentication process and the like.

The client terminal 1002 sends a connection request signal. In response to this, at step SP1001, the control section 1050 of the portal server 1003 receives the connection request signal via the network interface 1053 and the communication control section 1052 in order. The received connection request signal contains the authentication session ID information and the like. The control section 1050 sends the authentication session ID information and the like to the authentication processing section 1056.

Under the control of the control section 1050, the authentication processing section 1056 performs the user authentication process based on the authentication session ID information and the like received as the connection request signal from the client terminal 1002.

As a result, the authentication processing section 1056 may not be able to authenticate the user of the client terminal 1002 to be a registered user due to expiration of the valid period specified in the authentication session ID information and the like received from the client terminal 1002. In such case, the control section 1050 sends the authentication error information indicating an authentication error to the client terminal 1002 via the communication control section 1052 and the network interface 1053 in order.

At step SP1002, the control section 1023 of the client terminal 1002 receives the authentication error information sent from the portal server 1003 via the network interface 1033 and the communication control section 1032 in order. In response to this, the control section 1023 reads the user ID information, the password information, and the like stored in the authentication information storage section 1038. The control section 1023 sends the read user ID information, password information, and the like to the portal server 1003 via the communication control section 1032 and the network interface 1033 in order.

At step SP1003, the control section 1050 of the portal server 1003 receives the user ID information, the password information, and the like sent from the client terminal 1002 via the network interface 1053 and the communication control section 1052 in order. The control section 1050 sends these pieces of information to the authentication processing section 1056.

Under the control of the control section 1050, the authentication processing section 1056 performs the user authentication process. Specifically, the authentication processing section 1056 checks if the received user ID information, password information, and the like are included in the customer information registered to the customer database section 1054.

As a result, the authentication processing section 1056 may authenticate the user of the client terminal 1002 to be a registered user. In this case, under the control of the control section 1050, the authentication processing section 1056 issues the portal authentication result information, i.e., the authentication session ID information and the like about communication connection state between the client terminal 1002 and the portal server 1003 at this time. In addition, the authentication processing section 1056 temporarily stores the authentication session ID information and the like in the authentication information storage section 1057.

After the authentication processing section 1056 issued the authentication session ID information and the like to the client terminal 1002, the control section 1050 sends these pieces of information to the client terminal 1002 via the communication control section 1052 and the network interface 1053 in order.

At step SP1004, the control section 1023 of the client terminal 1002 receives the authentication session ID information and the like sent from the portal server 1003 via the network interface 1033 and the communication control section 1032 in order. The control section 1023 then sends the received authentication session ID information and the like to the authentication processing section 1037.

Under the control of the control section 1023, the authentication processing section 1037 temporarily stores the received authentication session ID information and the like in the authentication information storage section 1038.

The control section 1023 receives the page information acquisition request signal from the portal server 1003 to request the portal server 1003 for the page information. The control section 1023 sends the received signal together with the authentication session ID information and the like temporarily stored in the authentication information storage section 1038 to the portal server 1003 via the communication control section 1032 and the network interface 1033 in order.

At step SP1005, the control section 1050 of the portal server 1003 receives the page information acquisition request signal, the authentication session ID information, and the like sent from the client terminal 1002 via the network interface 1053 and the communication control section 1052 in order. The control section 1050 sends the received authentication session ID information and the like to the authentication processing section 1056.

Under the control of the control section 1050, the authentication processing section 1056 performs the user authentication process. Specifically, the authentication processing section 1056 compares the received authentication session ID information and the like with the authentication session ID information and the like that were issued to the client terminal 1002 at the above-mentioned step SP1003 and were temporarily stored in the authentication information storage section 1057.

As a result, at step SP1006, the authentication processing section 1056 authenticates the user of the client terminal 1002 to be a registered user. The authentication processing section 1056 determines that the terminal 1002 issued the valid acquisition request for the page information. The authentication processing section 1056 extends the valid period for the authentication session ID information and the like issued to the client terminal 1002.

At this time, the control section 1050 reads the user-requested page information from the page information storage section 1055. The control section 1050 sends the read page information, the authentication session ID information, and the like to the client terminal 1002 via the communication control section 1052 and the network interface 1053 in order. At this time, the authentication session ID information and the like are assigned with the valid period extended by the authentication processing section 1056.

At step SP1007, the control section 1023 of the client terminal 1002 receives the page information sent from the portal server 1003 and the authentication session ID information with the extended valid period and the like via the network interface 1033 and the communication control section 1032 in order. The control section 1023 sends the received page information to the page information generation section 1036 and sends the authentication session ID information with the extended valid period and the like to the authentication processing section 1037.

Based on the page information supplied from the control section 1023, the page information generation section 1036 generates video data embedded with links to the service provision servers. The page information generation section 1036 sends the generated video data to the display control section 1024.

The display control section 1024 applies a digital-analog conversion process to the video data supplied from the page information generation section 1036. The display control section 1024 then sends the converted analog video signal to the display section 1025. As a result, the display section 1025 displays the page of the portal server 1003 as a video based on the analog video signal.

The authentication processing section 1037 updates the authentication session ID information and the like temporarily stored at the above-mentioned step SP1004 to the authentication session ID information with the extended valid period and the like as follows. Under the control of the control section 1023, the authentication processing section 1037 temporarily stores the authentication session ID information with the extended valid period and the like received from the portal server 1003 in the authentication information storage section 1038 so as to overwrite the authentication session ID information having the valid period not extended and the like.

Figure 17:
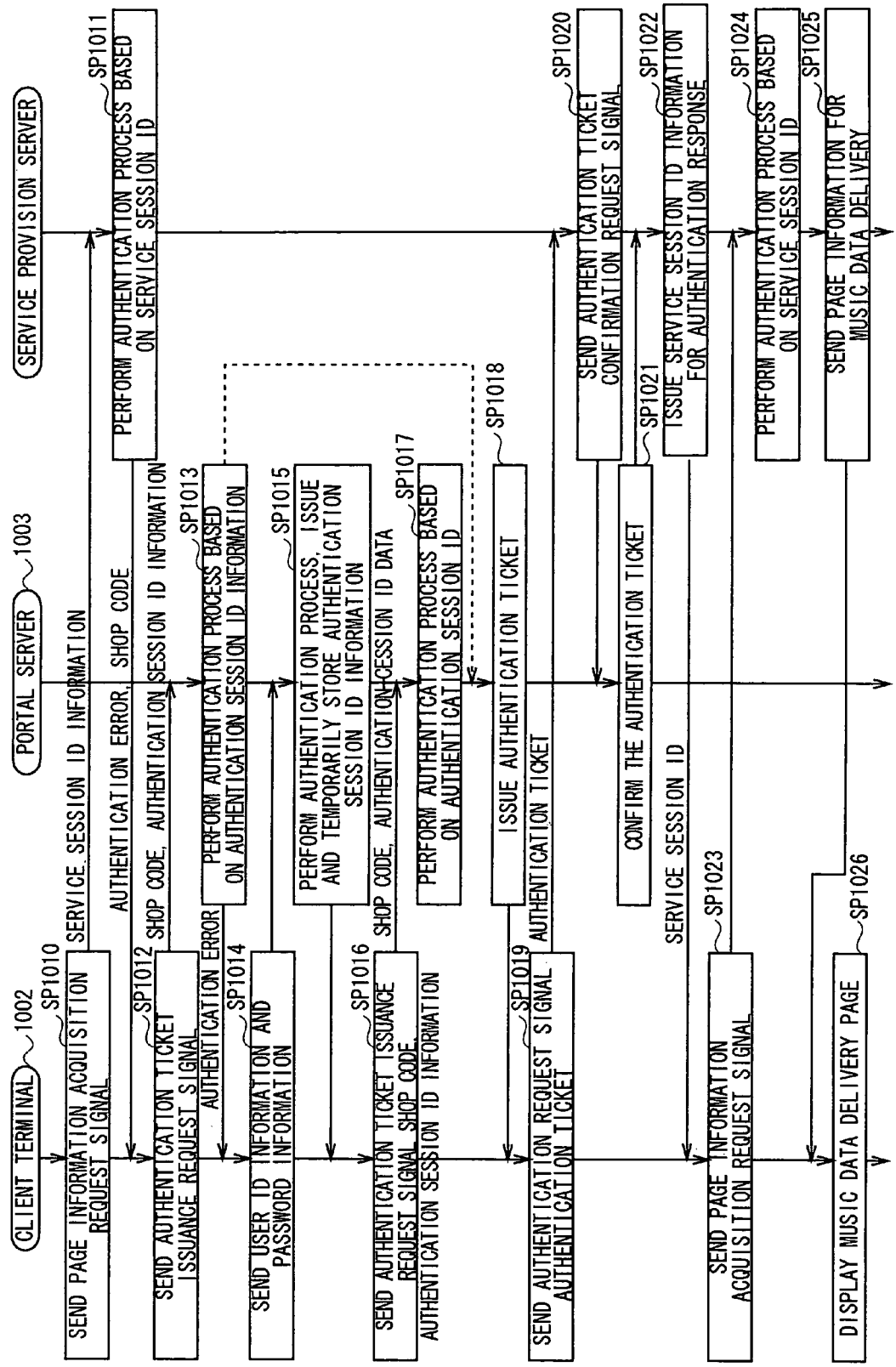
FIG. 17 is a sequence chart showing a user authentication process between the client terminal and a service provision server.

(2-4-2) User Authentication Process between the Client Terminal 1002 and the Service Provision Server With reference to FIG. 17, the following describes the user authentication process performed between the client terminal 1002 and each service provision server.

Actually, there are provided a plurality of service provision servers corresponding to provided services such as the radio broadcast information delivery server 1006, a music data delivery server (not shown), and the like. The same user authentication process is performed between the client terminal 2 and whichever of these service provision servers.

For this reason, each service provision server comprises the components needed to perform the user authentication process such as the control section, the authentication processing section, the page information storage section, the authentication information storage section, the communication control section, and the network interface. For example, the radio broadcast information delivery server comprises the control section 1110, the authentication processing section 1115, the page information storage section 1116, the authentication information storage section 1116, the communication control section 1112, and the network interface 1113.

In one case, the user authentication process is performed when the client terminal 1002 accesses the service provision servers according to links in, the page information acquired from the portal server 1003. In another case, the user authentication process is performed when the client terminal 1002 accesses the service provision servers according to the URL information and the like already registered as bookmarks. In either case, the user authentication process is performed in the same procedure.

In consideration for this, the following describes the user authentication process in detail.

At step SP1010, the control section 1023 of the client terminal 1002 follows the URL information embedded as links in the page information or the URL information and the like already registered as bookmarks. The control section 1023 then sends the page information acquisition request signal as well as the service session ID information and the like read from the authentication information storage section 1038 to the service provision server via the communication control section 1032 and the network interface 1033 in order. The page information acquisition request signal requests to acquire the page information about the service provision page, e.g., the on-air-list information delivery page for the radio broadcast information delivery server.

The client terminal 1002 establishes a communication connection with each service provision server to perform various processes such as the user authentication process. Each time this communication connection is established, the service provision server accessed by the client terminal 1002 issues the service session ID information as identification information to identify respective communication connection states (i.e., sessions).

For the use with the user authentication process and the like, the service session ID information, like the authentication session ID information, is assigned with a specified valid period (e.g., approximately one minute) with reference to the time of issuance from each service provision server.

The client terminal 1002 acquires the service session ID information from each service provision server. There may be a case where the client terminal 1002 cannot supply the service session ID information to the information-issuing service provision server within the valid period. In such case, the information-issuing service provision server determines cancellation of the communication connection state specified by the service session ID information.

In this manner, each service provision server prevents the previously issued service session ID information from being falsely used by a user not contracted with the service provider of the information provision system.

The authentication information storage section 1038 temporarily stores the service session ID information. This service session ID information was issued by the access destination service provision server that established communication connection with the client terminal 1002 to perform the user authentication process and the like.

At step SP1011, the service provision server's control section receives the page information acquisition request signal, the service session ID information, and the like sent from the client terminal 1002 via the network interface and the communication control section in order. The control section sends the received service session ID information and the like to the authentication processing section.

Under the control of the control section, the authentication processing section performs the user authentication process. Specifically, the authentication processing section compares the received service session ID information and the like with the service session ID information and the like temporarily stored in the authentication information storage section.

As a result, the authentication processing section may not be able to authenticate the user of the client terminal 1002 to be a registered user, e.g., due to expiration of the valid period for the service session ID information received from the client terminal 1002. In such case, the authentication processing section determines that the client terminal 1002 issued an invalid acquisition request for the page information about the service provision page.

In this case, the control section sends authentication error information and a shop code to the client terminal 1002 via the communication control section and the network interface in order. The authentication error information indicates an authentication error. The shop code is provided as service identification information to identify the service provision server.

At step SP1012, the control section 1023 of the client terminal 1002 receives the authentication error information and the shop code sent from the service provision server via the network interface 1033 and the communication control section 1032 in order. According to the received authentication error information, the control section 1023 determines that the service provision server does not authenticate the user as a registered user. In addition, the control section 1023 temporarily stores the shop code received from the service provision server in the authentication information storage section 1038.

The control section 1023 generates an authentication ticket issuance request signal that requests the portal server 1003 to issue an authentication ticket for access to the service provision server. The control section 1023 then sends the generated authentication ticket issuance request signal, the service provision server's shop code, the authentication session ID information, and the like to the portal server 1003 via the communication control section 1032 and the network interface 1033 in order. It should be noted that the authentication session ID information and the like are already received from the portal server 1003 and are temporarily stored in the authentication information storage section 1038.

At step SP1013, the control section 1050 of the portal server 1003 receives the authentication ticket issuance request signal, the shop code, the authentication session ID information, and the like sent from the client terminal 1002 via the network interface 1053 and the communication control section 1052 in order. The control section 1050 then sends these pieces of information to the authentication processing section 1056.

Under the control of the control section 1050, the authentication processing section 1056 performs the user authentication process. Specifically, the control section 1056 compares the authentication session ID information and the like with the authentication session ID information and the like temporarily stored in the authentication information storage section 1057.

As a result, the authentication processing section 1056 may not be able to authenticate the user of the client terminal 1002 to be a registered user, e.g., due to expiration of the valid period for the authentication session ID information received from the client terminal 1002. In such case, the authentication processing section 1056 determines that the client terminal 1002 issued an invalid acquisition request for the authentication ticket.

In this case, the control section 1050 sends authentication error information indicating an authentication error to the client terminal 1002 via the communication control section 1052 and the network interface 1053 in order.

By contrast, there may be a case where the valid period still takes effect for the authentication session ID information received from the client terminal 1002. In such case, the authentication processing section 1056 authenticates the user of the client terminal 1002 to be a registered user. The authentication processing section 1056 determines that the client terminal 1002 issues a valid request for the authentication ticket. In this case, the control section 1050 returns to step SP1018 to be described later.

At step SP1014, the control section 1023 of the client terminal 1002 receives the authentication error information sent from the portal server 1003 via the network interface 1033 and the communication control section 1032 in order. The control section 1023 then reads the user ID information, the password information, and the like stored in the authentication information storage section 1038. In addition, the control section 1023 sends these pieces of information to the portal server 1003 via the communication control section 1032 and the network interface 1033 in order.

At step SP1015, the control section 1050 of the portal server 1003 receives the user ID information, the password information, and the like sent from the client terminal 1002 via the network interface 1053 and the communication control section 1052 in order. The control section 1050 then sends these pieces of information to the authentication processing section 1056.

Under the control of the control section 1050, the authentication processing section 1056 performs the user authentication process. Specifically, the authentication processing section 1056 checks whether or not the customer information registered to the customer database section 1054 contains the received user ID information, the password information, and the like.

As a result, the authentication processing section 1056 authenticates the user of the client terminal 1002 to be a registered user. Under the control of the control section 1050, the authentication processing section 1056 issues the portal authentication result information, i.e., the authentication session ID information and the like about the state of communication connection between the client terminal 1002 and the portal server 1003 at the present time. The authentication processing section 1056 temporarily stores the issued authentication session ID information and the like in the authentication information storage section 1057.

After the authentication processing section 1056 issues the authentication session ID information and the like to the client terminal 1002, the control section 1050 sends the authentication session ID information and the like to the client terminal 1002 via the communication control section 1052 and the network interface 1053 in order.

At step SP1016, the control section 1023 of the client terminal 1002 receives the authentication session ID information and the like sent from the portal server 1003 via the network interface 1033 and the communication control section 1032 in order. The authentication processing section 1037 temporarily stores the received authentication session ID information and the like in the authentication information storage section 1038.

The control section 1023 generates an authentication ticket issuance request signal that re-requests the portal server 1003 to issue an authentication ticket. The control section 1023 sends the generated authentication ticket issuance request signal as well as the shop code temporarily stored in the authentication information storage section 1038 and the authentication session ID information and the like temporarily stored at this time to the portal server 1003 via the communication control section 1032 and the network interface 1033 in order.

According to the embodiment, the client terminal 1002 temporarily stores the shop code in the authentication information storage section 1038. The present invention is not limited thereto. When performing the process at steps SP1012 through SP1016, the client terminal 1002 can sequentially exchange the shop code with the portal server 1003. In this manner, the client terminal 1002 need not temporarily store the shop code in the authentication information storage section 1038. Nevertheless, it is possible to send the shop code to the portal server 1003 at step SP1016.

At step SP1017, the control section 1050 of the portal server 1003 receives the authentication ticket issuance request signal, the shop code, the authentication session ID information, and the like sent from the client terminal 1002 via the network interface 1053 and the communication control section 1052 in order. The control section 1050 sends the received authentication ticket issuance request signal and the like to the authentication processing section 1056.

Under the control of the control section 1050, the authentication processing section 1056 performs the user authentication process. Specifically, the authentication processing section 1056 compares the received authentication session ID information and the like with the authentication session ID information and the like temporarily stored in the authentication information storage section 1057.

As a result, there may be a case where the valid period still takes effect for the authentication session ID information and the like received from the client terminal 1002. In such case, the authentication processing section 1056 authenticates the user of the client terminal 1002 to be a registered user. The authentication processing section 1056 determines that the client terminal 1002 issues a valid request for the authentication ticket.

At step SP1018, under the control of the control section 1050, based on the shop code and the authentication ticket issuance request signal received from the client terminal 1002 at the above-mentioned step SP1017. The authentication processing section 1056 issues the portal authentication result information, i.e., an authentication ticket and the like to enable access to the service provision server indicated by the shop code.

Under the control of the control section 1050, the authentication processing section 1056 temporarily stores the issued authentication ticket and the like in the authentication information storage section 1057. In addition, the authentication processing section 1056 extends the valid period for the authentication session ID information and the like issued to the client terminal 1002.

That is to say, the authentication processing section 1056 has issued the authentication ticket and the like and extended the valid period of the authentication session ID information and the like. Thereafter, the control section 1050 sends these authentication ticket and the like and authentication session ID information and the like to the client terminal 1002 via the communication control section 1052 and the network interface 1053 in order.

At step SP1019, the control section 1023 of the client terminal 1002 receives the authentication ticket and the like sent from the portal server 1003 and the authentication session ID information with the extended valid period via the network interface 1033 and the communication control section 1032 in order. The control section 1023 sends the received authentication session ID information to the authentication processing section 1037.

The control section 1023 sends the authentication ticket and the like received from the portal server 1003 together with the authentication request signal to the service provision server via the communication control section 1032 and the network interface 1033 in order.

At this time, under the control of the control section 1023, the authentication processing section 1037 temporarily stores the authentication session ID information having the extended valid period received from the portal server 1003 in the authentication information storage section 1038 so as to overwrite the authentication session ID information having the valid period not extended. In this manner, the authentication processing section 1037 updates the authentication session ID information temporarily stored at the above-mentioned step SP1016 to the authentication session ID information having the extended valid period.

At step SP1020, the control section of the service provision server receives the authentication request signal, the authentication ticket, and the like sent from the client terminal 1002 via the network interface and the communication control section in order.

The control section sends the authentication ticket and the like received from the client terminal 1002 together with an authentication ticket confirmation request signal for requesting confirmation of the authentication ticket and the like to the portal server 1003 via the communication control section and the network interface in order.

At step SP1021, the control section 1050 of the portal server 1003 receives the authentication ticket confirmation request signal, the authentication ticket, and the like sent from the service provision server via the network interface 1053 and the communication control section 1052 in order. The control section 1050 then sends the received authentication ticket confirmation request signal, the authentication ticket, and the like to the authentication processing section 1056.

Under the control of the control section 1050, the authentication processing section 1056 performs a confirmation process for the authentication ticket received from the service provision server in response to the authentication ticket confirmation request signal. Specifically, the authentication processing section 1056 compares the received authentication ticket and the like with the authentication ticket and the like temporarily stored in the authentication information storage section 1057.

As a result, the authentication processing section 1056 confirms that the genuine authentication ticket and the like are received from the service provision server. In this case, the control section 1050 sends confirmation result information to the service provision server via the communication control section 1052 and the network interface 1053 in order. The confirmation result information indicates that the received authentication ticket and the like are confirmed to be genuine.

At step SP1022, the control section of the service provision server receives the confirmation result information sent from the portal server 1003 via the network interface and the communication control section in order. The control section sends the received confirmation result information to the authentication processing section.

Under the control of the control section, the authentication processing section responds to the confirmation result information and issues server authentication result information, i.e., service session ID information and the like about the state of communication connection between the client terminal 1002 and the service provision server at the present time. In addition, the authentication processing section temporarily stores the issued service session ID information and the like in the authentication information storage section.

After the authentication processing section issued the service session ID information and the like to the client terminal 1002, the control section sends these pieces of information to the client terminal 1002 via the communication control section and the network interface in order.

At step SP1023, the control section 1023 of the client terminal 1002 receives the service session ID information and the like sent from the service provision server via the network interface 1033 and the communication control section 1032 in order. The authentication processing section 1037 temporarily stores the received service session ID information and the like in the authentication information storage section 1038.

The control section 1023 sends the page information acquisition request signal, the service session ID information, and the like to the service provision server via the communication control section 1032 and the network interface 1033 in order. The page information acquisition request signal requests the page information about the service provision page. The service session ID information is temporarily stored in the authentication information storage section 1038.

As step SP1024, the control section of the service provision server receives the page information acquisition request signal, the service session ID information, and the like sent from the client terminal 1002 via the network interface and the communication control section in order. The control section then sends the received service session ID information and the like to the authentication processing section.

Under the control of the control section, the authentication processing section performs the user authentication process. Specifically, the control section compares the received service session ID information and the like with the service session ID information and the like that are already issued to the client terminal 1002 at the above-mentioned step SP1022 and are temporarily stored in the authentication information storage section.

As a result, there may be a case where the valid period still takes effect for the service session ID information and the like received from the client terminal 1002. In such case, the authentication processing section authenticates the user of the client terminal 1002 to be a registered user. Then, the authentication processing section determines that the client terminal 1002 issues a valid request to acquire the page information about the service provision page.

The control section then proceeds to the next step SP1025. At step SP1025, the control section reads the page information about the user-requested service provision page from the page information storage section. In addition, the control section allows the authentication processing section to extend the valid period for the service session ID information and the like issued to the client terminal 1002.

The control section sends the page information about the service provision page read from the page information storage section together with the service session ID information and the like to the client terminal 1002 via the communication control section and the network interface in order. The service session ID information and the like have the valid period extended by the authentication processing section.

At step SP1026, the control section 1023 of the client terminal 1002 receives the page information about the service provision page, the service session ID information having the extended valid period, from the service provision server via the network interface 1033 and the communication control section 1032 in order. The control section 1023 sends the page information about the received service provision page to the page information generation section 1036. In addition, the control section 1023 sends the received service session ID information and the like to the authentication processing section 1037.

Under the control of the control section 1023, the authentication processing section 1037 temporarily stores the received service session ID information having the extended valid period in the authentication information storage section 1038 so as to overwrite the service session ID information having the valid period not extended and the like. In this manner, the authentication processing section 1037 updates the service session ID information and the like temporarily stored at the above-mentioned step SP1023 to the service session ID information having the extended valid period.

Further, the page information generation section 1036 generates video data based on the page information about the service provision page. The page information generation section 1036 sends the generated video data to the display control section 1024.

The display control section 1024 applies a digital-analog conversion process to the video data supplied from the page information generation section 1036. The display control section 1024 then sends the converted analog video signal to the display section 1025. As a result, the display section 1025 displays the service provision page as a video based on the analog video signal.

(2-4-3) Radio Broadcast Information Delivery Service Provision Processes

Figure 18:
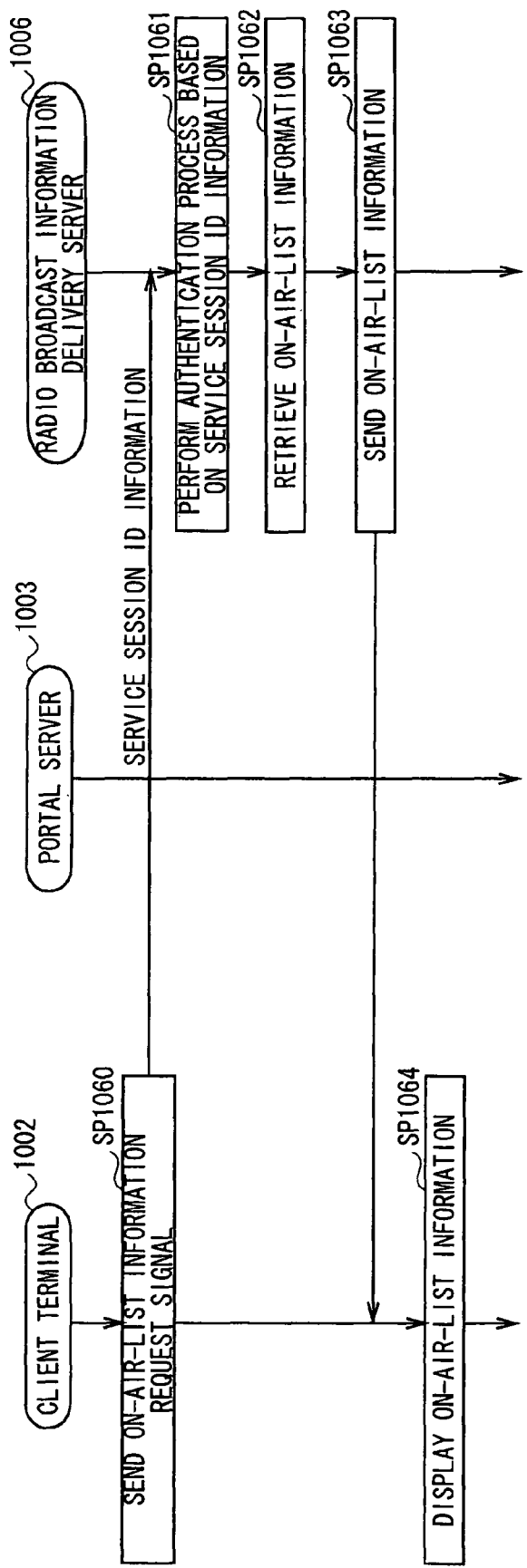
FIG. 18 is a sequence chart showing a radio broadcast information (on-air-list information) delivery service provision process.
Figure 19:
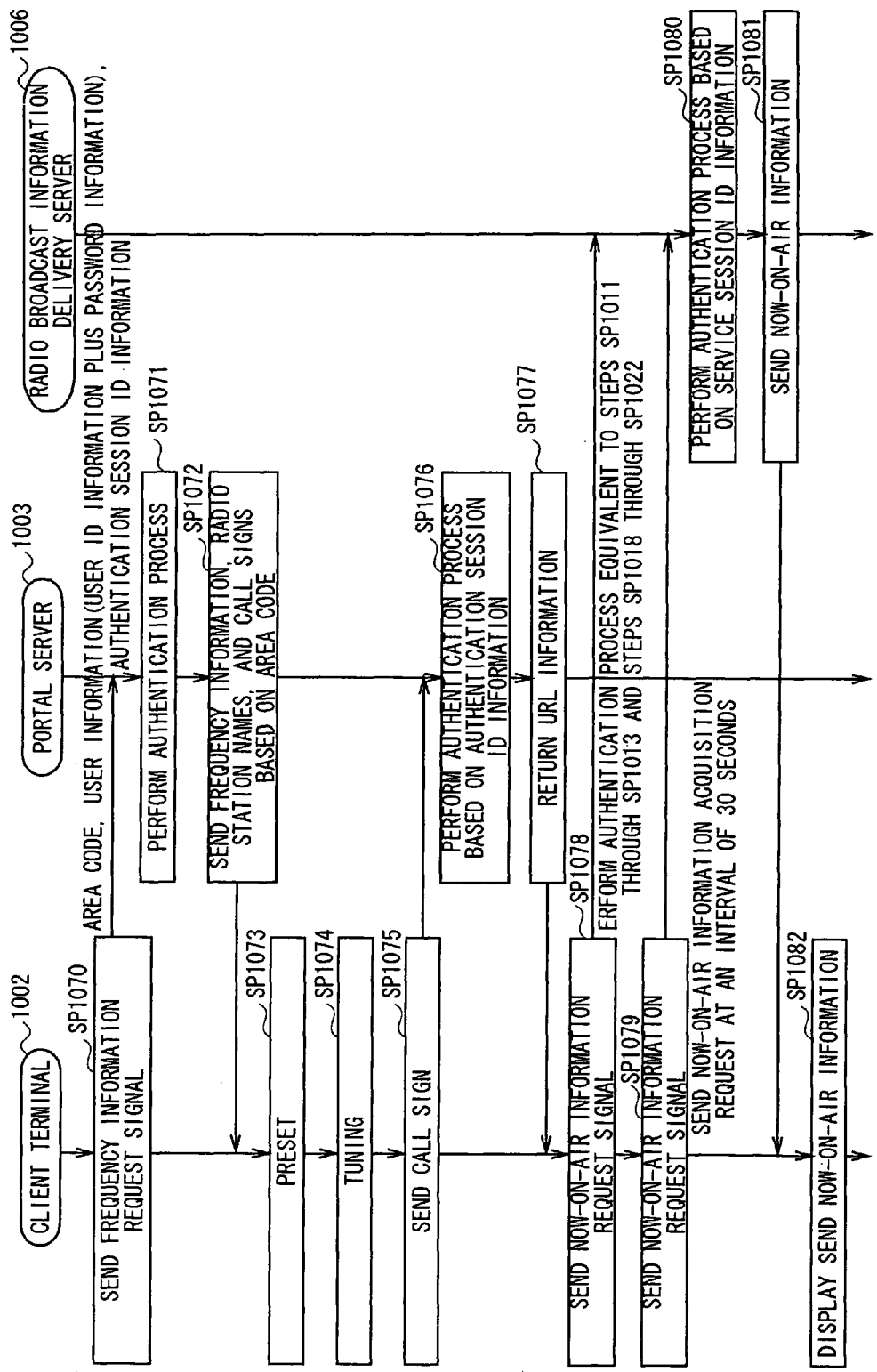
FIG. 19 is a sequence chart showing a radio broadcast information (now-on-air information) delivery service provision process.

Referring now to FIGS. 18 and 19, the following describes a radio broadcast information delivery service provision process. This process takes place after termination of the user authentication process (FIG. 17) performed between the client terminal 1002 and the service provision server as mentioned above. The process uses the page information about the service provision page acquired by the client terminal 1002 from the service provision server during the user authentication process. In this manner, a radio broadcast information delivery service is provided from the radio broadcast information delivery server, one of the service provision servers, for example.

(2-4-3-1) On-Air-List Information Delivery Service Provision Process

With reference to FIG. 18, the following describes the radio broadcast information delivery service provision process. During this process, the client terminal 1002 is provided with a radio broadcast information delivery service, especially an on-air-list information delivery service from the radio broadcast information delivery server 1006.

For example, the user enters retrieval key to retrieve intended on-air-list information into an input box of the on-air-list information delivery page displayed as a video on the display section 1025. The input processing section 1021 inputs a control command corresponding to a character string indicating the entered retrieval key. At step SP1060, the control section 1023 of the client terminal 1002 responds to the entered control command and generates an on-air-list information request signal to request download of the intended on-air-list information.

The control section 1023 sends the on-air-list information request signal together with the service session ID information and the like to the radio broadcast information delivery server 1006 via the communication control section 1032 and the network interface 1033 in order. The service session ID information and the like are already issued by the radio broadcast information delivery server 1006 and are temporarily stored in the authentication information storage section 1038.

At step SP1061, the control section 1110 of the radio broadcast information delivery server 1006 receives the on-air-list information request signal, the service session ID information, and the like sent from the client terminal 1002 via the network interface 1113 and the communication control section 1112 in order. The control section 1110 then sends the received service session ID information and the like to the authentication processing section 1115.

Under the control of the control section 1110, the authentication processing section 1115 performs the user authentication process. Specifically, the authentication processing section 1115 compares the received service session ID information and the like with the service session ID information and the like temporarily stored in the authentication information storage section 1120.

As a result, the authentication processing section 1115 may authenticate the user to be a registered user who requested the on-air-list information using the client terminal 1002. In this case, the control section 1110 proceeds to the next step SP1062.

At step SP1062, based on the retrieval key stored in the on-air-list information request signal, the retrieval section 1118 searches the entire on-air-list information in the on-air-list information storage section 1117 for the targeted on-air-list information within a specified range corresponding to the retrieval condition indicated by the retrieval key.

Let us assume that the retrieval section 1118 retrieves the on-air-list information. The control section 1110 allows the authentication processing section 1115 to extend the valid period for the service session ID information and the like issued to the client terminal 1002. The control section 1110 then proceeds to the next step SP1063.

At step SP1063, the control section 1110 reads the on-air-list information retrieved by the retrieval section 1118 from the on-air-list information storage section 1117. In addition, the control section 1110 sends the read on-air-list information together with the service session ID information and the like to the client terminal 1002 via the communication control section 1112 and the network interface 1113 in order. At this time, the service session ID information has the valid period extended by the authentication processing section 1115.

At step SP1064, the control section 1023 of the client terminal 1002 receives the on-air-list information sent from the radio broadcast information delivery server 1006, the service session ID information having the extended valid period, and the like via the network interface 1033 and the communication control section 1032 in order. The control section 1023 sends the received on-air-list information to the page information generation section 1036. In addition, the control section 1023 sends the service session ID information and the like received from the radio broadcast information delivery server 1006 to the authentication processing section 1037.

Under the control of the control section 1023, the authentication processing section 1037 temporarily stores the received service session ID information having the extended valid period in the authentication information storage section 1038 so as to overwrite the service session ID information having the valid period not extended. In this manner, the authentication processing section 1037 updates the contents of the service session ID information and the like temporarily stored in the authentication information storage section 1038.

The page information generation section 1036 generates video data based on the on-air-list information supplied from the control section 1023. The display control section 1024 converts the generated video data into an analog video signal and sends it to the display section 1025. The display section 1025 displays the on-air-list information as a video based on the analog video signal.

In this manner, the client terminal 1002 can allow the user to acquire intended on-air-list information by using the radio broadcast information delivery service provided by the radio broadcast information delivery server 1006.

(2-4-3-2) Now-on-Air Information Delivery Service Provision Process

With reference to FIG. 19, the following describes a radio broadcast information delivery service provision process. During this process, the client terminal 1002 is provided with a radio broadcast information delivery service, especially a now-on-air information delivery service from the radio broadcast information delivery server 1006.

The radio broadcast information delivery server 1006 to supply now-on-air information is provided for each radio station (call sign).

Initially, the client terminal 1002 may not store URL information about the radio broadcast information delivery server 1006 corresponding to each radio station.

The following radio broadcast information delivery service provision process exemplifies a case where the portal server 1003 manages URL information about each radio broadcast information delivery server 1006 for each call sign.

According to the radio broadcast information delivery service provision process, the client terminal 1002 may need to automatically preset a broadcast frequency for each radio station. For this purpose, the client terminal 1002 requests the portal server 1003 for frequency information indicating that broadcast frequency. In such case, it is assumed that the authentication information storage section 1038 does not temporarily store the authentication session ID information and the like. Consequently, the client terminal 1002 first needs to send the user ID information, the password information, and the like to the portal server 1003.

When the input processing section 1021 inputs an operation command to request to automatically preset the broadcast frequency of each radio station. In response to this command, at step SP1070, the control section 1023 of the client terminal 1002 sends a frequency information request signal to request to acquire frequency information about a broadcast frequency which each radio station can receive. The control section 1023 sends the frequency information request signal together with an area code input by the user, the user ID information, the password information, and the like stored in the authentication information storage section 1038 to the portal server 1003 via the communication control section 1032 and the network interface 1033 in order.

At step SP1071, the control section 1050 of the portal server 1003 receives the frequency information request signal, the area code, the user ID information, the password information, and the like sent from the client terminal 1002 via the network interface 1053 and the communication control section 1052 in order. Of these pieces of information, the control section 1050 sends the user ID information, the password information, and the like to the authentication processing section 1056.

Under the control of the control section 1050, the authentication processing section 1056 performs the user authentication process. Specifically, the authentication processing section 1056 compares the received user ID information, the password information, and the like with the customer information registered in the customer database section 1054.

As a result, the authentication processing section 1056 may authenticate the user of the client terminal 1002 to be a registered user. Further, the authentication processing section 1056 may determine that the client terminal 1002 issued a valid request to acquire the frequency information. Under the control of the control section 1050, the authentication processing section 1056 issues the authentication session ID information and the like about the state of communication connection between the client terminal 1002 and the portal server 1003 at the present time. The authentication processing section 1056 temporarily stores the issued authentication session ID information and the like in the authentication information storage section 1057.

The control section 1050 then proceeds to the next step SP1072. At step SP1072, the control section 1050 performs a search based on the area code received from the client terminal 1002. That is to say, the control section 1050 searches a list of a plurality of frequency information, radio station names, and call signs in the frequency information storage section 1058 for those corresponding to the area code and reads them in a list format.

The control section 1050 reads the frequency information, the radio station name, and the call sign in a list form from the frequency information storage section 1058 and sends them along with the authentication session ID information and the like to the client terminal 1002 via the communication control section 1052 and the network interface 1053 in order. The authentication session ID information and the like were issued to the client terminal 1002 by the authentication processing section 1056 at the above-mentioned step SP1071.

At step SP1073, the control section 1023 of the client terminal 1002 receives the list of frequency information, radio station name, and call sign sent from the portal server 1003 as well as the authentication session ID information and the like via the network interface 1033 and the communication control section 1032 in order. The control section 1023 sends the authentication session ID information and the like received from the portal server 1003 to the authentication processing section 1037. In addition, the control section 1023 sends the list of frequency information, radio station name, and call sign to the display control section 1024.

Under the control of the control section 1023, the authentication processing section 1037 temporarily stores the received authentication session ID information and the like in the authentication information storage section 1038.

The display control section 1024 is supplied with the list of frequency information, radio station name, and call sign from the control section 1023 and sends the list to the display section 1025. The display section 1025 thus displays the list.

At this time, the control section 1023 identifies a selection command supplied from the input processing section 1021. Based on this command, the control section 1023 stores the selected frequency information, radio station name, and call sign as a preset in the storage medium 1029. The control section 1023 then proceeds to the next step SP1074.

At step SP1074, the control section 1023 identifies a tuning control command supplied from the input processing section 1021. Based on this command, the control section 1023 controls the tuner section 1031 so as to extract a radio broadcasting signal from radio broadcasting waves. This radio broadcasting signal should be used for the radio broadcast carried at the broadcast frequency corresponding to the tuning control command.

A broadcast signal reception section 30 receives radio broadcasting waves. Of these radio broadcasting waves, the tuner section 1031 extracts the radio broadcasting signal carried at the broadcast frequency. The tuner section 1031 applies specified reception processes such as decoding to the extracted radio broadcasting signal. As a result, audio data is generated. The tuner section 1031 sends this audio data to the audio control section 1026.

The audio control section 1026 converts the audio data supplied from the tuner section 1031 into an analog audio signal. Then, the audio control section 1026 outputs the analog audio signal to the speaker 1027. The speaker 1027 thus outputs audio of the selected radio program.

At step SP1075, under the control of the control section 1023, the radio broadcasting display control section 1039 reads a call sign from the storage medium 1029. This call sign is stored correspondingly to the frequency information indicating the broadcast frequency corresponding to the above-mentioned tuning control command. The radio broadcasting display control section 1039 sends the read call sign to the portal server 1003 via the communication control section 1032 and the network interface 1033 in order. Likewise, the radio broadcasting display control section 1039 sends authentication session ID information (alternatively, user ID information and password information) and the like temporarily stored in the authentication information storage section 1038.

At step SP1076, the control section 1050 of the portal server 1003 receives the call sign, the authentication session ID information (alternatively, user ID information and password information), and the like sent from the client terminal 1002 via the network interface 1053 and the communication control section 1052 in order. The control section 1050 sends the received authentication session ID information (alternatively, user ID information and password information) and the like to the authentication processing section 1056.

Under the control of the control section 1050, the authentication processing section 1056 performs the user authentication process. Specifically, the authentication processing section 1056 compares the received authentication session ID information (alternatively, user ID information and password information) and the like with the received authentication session ID information (alternatively, user ID information and password information) and the like temporarily stored in the authentication information storage section 1057.

As a result, the authentication processing section 1056 may confirm that the authentication session ID information and the like are received from the client terminal 1002 within the valid period, for example. When the user sent the call sign using the client terminal 1002, the authentication processing section 1056 may authenticate this user to be a registered user. In such case, the control section 1050 proceeds to the next step SP1077.

At step SP1077, the control section 1050 searches a plurality of URL information in the URL storage section 1059 for the URL information corresponding to the call sign based on the call sign received from the client terminal 1002.

The control section 1050 allows the authentication processing section 1056 to extend the valid period of the authentication session ID information and the like issued to the client terminal 1002.

The control section 1050 reads the retrieved URL information from the URL storage section 1059. The control section 1050 sends the read URL information as well as the authentication session ID information and the like having the valid period extended by the authentication processing section 1056 to the client terminal 1002 via the communication control section 1052 and the network interface 1053 in order. Further, at step SP1077, the control section 1050 may send the state information as well as the URL information and authentication session ID. The state information indicates service states such as whether or not the radio broadcast information delivery server 1006 currently provides the now-on-air information service.

At step SP1078, the control section 1023 of the client terminal 1002 receives the URL information and the authentication session ID information having the extended valid period and the like sent from the portal server 1003 via the network interface 1033 and the communication control section 1032 in order. The control section 1023 sends the received authentication session ID information and the like to the authentication processing section 1037. The control section 1023 sends the URL information to the radio broadcasting display control section 1039. When receiving the state information from the portal server 1003, the control section 1023 sends this state information to the radio broadcasting control section 1039.

Under the control of the control section 1023, the authentication processing section 1037 temporarily stores the received authentication session ID information having the extended valid period in the authentication information storage section 1038 to overwrite the authentication session ID information having the valid period not extended. In this manner, the authentication processing section 1037 updates the contents of the authentication session ID information and the like temporarily stored in the authentication information storage section 1038.

Under the control of the control section 1023, the radio broadcasting display control section 1039 temporarily stores the URL information supplied from the control section 1023 in the storage medium 1029 and the like correspondingly to the call sign stored in the storage medium 1029.

When supplied with the state information from the control section 1023, the radio broadcasting display control section 1039 sends the state information to the display section 1025 via the display control section 1024. The display section 1025 is allowed to display the state information indicative of the service state in the radio broadcast information delivery server 1006.

Under the control of the control section 1023, the radio broadcasting display control section 1039 follows the URL information temporarily stored in the storage medium 1029 and the like. According to this information, the radio broadcasting display control section 1039 sends a now-on-air information request signal to the radio broadcast information delivery server 1006 via the communication control section 1032 and the network interface 1033 in order. The now-on-air information request signal requests to acquire the now-on-air information. Likewise, the radio broadcasting display control section 1039 sends the service session ID information and the like that are already received from the radio broadcast information delivery server 1006 and are temporarily stored in the authentication information storage section 1038.

In the radio broadcast information delivery service provision process, at step SP1078, the client terminal 1002 sends the now-on-air information request signal, the service session ID information, and the like to the radio broadcast information delivery server 1006. This process corresponds to the process at step SP1010 in FIG. 17 as mentioned above.

Therefore, in the radio broadcast information delivery service provision process, the process at step SP1078 is followed by the user authentication process equivalent to steps SP1011 through SP1013 and steps SP1018 through SP1022 in the client terminal 1002, the radio broadcast information delivery server 1006, and the portal server 1003 as mentioned above with reference to FIG. 17. After these steps are performed in succession, control proceeds to the next step SP1079.

At step SP1079, under the control of the control section 1023, the radio broadcasting display control section 1039 of the client terminal 1002 again follows the URL information temporarily stored in the storage medium 1029 and the like and sends a now-on-air information request signal to the radio broadcast information delivery server 1006 via the communication control section 1032 and the network interface 1033 in order. Likewise, the radio broadcasting display control section 1039 sends the service session ID information and the like that are already received from the radio broadcast information delivery server 1006 and are temporarily stored in the authentication information storage section 1038.

At step SP1080, the control section 1110 of the radio broadcast information delivery server 1006 receives the now-on-air information request signal, the service session ID information, and the like sent from the client terminal 1002 via the network interface 1113 and the communication control section 1112 in order. The control section 1110 sends the received authentication session ID information and the like to the authentication processing section 1115.

Under the control of the control section 1110, the authentication processing section 1115 performs the user authentication process. Specifically, the authentication processing section 1115 compares the received service session ID information and the like with the service session ID information and the like temporarily stored in the authentication information storage section 1120.

As a result, the authentication processing section 1115 may authenticate the user of the client terminal 1002 to be a registered user. In this case, the authentication processing section 1115 determines that the client terminal 1002 issued the valid request to acquire the now-on-air information.

When the authentication processing section 1115 authenticates the user of the client terminal 1002 to be a registered user. In this case, the control section 1110 extends the valid period of the service session ID information and the like issued to the client terminal 1002 by the authentication processing section 1115, and then proceeds to the next step SP1081.

At step SP1081, the control section 1110 reads the now-on-air information from the now-on-air information storage section 1119. The control section 1110 sends the read now-on-air information as well as the service session ID information and the like having the valid period extended by the authentication processing section 1115 to the client terminal 1002 via the communication control section 1112 and the network interface 1113 in order.

At step SP1082, the control section 1023 of the client terminal 1002 receives the now-on-air information and the service session ID information and the like having the extended valid period sent from the radio broadcast information delivery server 1006 via the network interface 1033 and the communication control section 1032 in order. The control section 1023 sends the received service session ID information and the like to the authentication processing section 1037. The control section 1023 sends the now-on-air information to the radio broadcasting display control section 1039.

Under the control of the control section 1023, the authentication processing section 1037 temporarily stores the received service session ID information having the extended valid period and the like in the authentication information storage section 1038 to overwrite the service session ID information having the valid period not extended. In this manner, the authentication processing section 1037 updates the contents of the service session ID information and the like temporarily stored in the authentication information storage section 1038.

Further, the radio broadcasting display control section 1039 sends the now-on-air information supplied from the control section 1023 to the display section 1025 via the display control section 1024. In this manner, the display section 1025 is allowed to display the now-on-air information concerning the radio program in the currently received radio broadcast.

In the radio broadcast information delivery service provision process, the client terminal 1002 thereafter periodically repeats the acquisition request for now-on-air information at step SP1079. The radio broadcast information delivery server 1006 receives the acquisition request from the client terminal 1002 and successively performs the process at steps SP1080 and SP1081.

In this manner, the client terminal 1002 can realtime update the now-on-air information and display it on the display section 1025 of the client terminal 1002. For example, the nowon-air information includes the name of the currently received radio program, the program broadcast start time, the program broadcast end time, the title and artist name of a musical composition currently played in the radio program, and the musical composition broadcast start time.

According to the above-mentioned configuration, the second embodiment can also provide the same effect as for the above-mentioned first embodiment.

According to the description of the above-mentioned first embodiment, the program modules for the client terminal CT (FIG. 7) include the HTTP message program 36 and the communicator program 37. These program modules can implement the same functions as the communication control section 1032 (FIG. 13) of the client terminal 1002 according to the second embodiment.

The content reproduction module 38 (FIG. 7) is a program module capable of implementing the same functions as the encoder/decoder section 1034 (FIG. 13).

The copyright protection information management module 39 (FIG. 7) is a program module capable of implementing the same functions as the copyright management section 1035 (FIG. 13).

The Internet radio channel selection/reproduction module 43 (FIG. 7) is a program module capable of implementing the same functions as the control section 1023 and the audio control section 1026 (FIG. 13).

The musical composition purchase/reproduction module 44 (FIG. 7) is a program module capable of implementing the same functions as the control section 1023 and the audio control section 1026 (FIG. 13).

The XML browser 50 (FIG. 7) is a program module capable of implementing the same functions as the input processing section 1021 and the page information generation section 1036 (FIG. 13).

The hard disk contents controller 42, the database access module 40, and the content data access module 41 (FIG. 7) are program modules capable of implementing the same functions as the control section 1023 (FIG. 13).

The authentication library 47A of the library 47 (FIG. 7) is a program module capable of implementing the same functions as the authentication processing section 1037 and the authentication information storage section 1038 (FIG. 13).

The clip library 47B of the library 47 (FIG. 7) is a program module capable of implementing the same functions as the control section 1023 (FIG. 13).

The associated information display module 45 (FIG. 7) is a program module capable of implementing the same functions as the radio broadcasting display control section 1039 (FIG. 13).

The tuner selection/reproduction/recording module 46 (FIG. 7) is a program module capable of implementing the same functions as the control section 1023, the audio control section 1026, and the tuner section 1031 (FIG. 13).

The audio user interface 51 (FIG. 7) is a program module capable of implementing the same functions as the input processing section 1021, the control section 1023, and the display control section 1024 (FIG. 13).

The CD reproduction module 48 (FIG. 7) is a program module capable of implementing the same functions as the audio control section 1026 and the external recording media recording and reproducing section 1028 (FIG. 13).

The HDD reproduction module 49 (FIG. 7) is a program module capable of implementing the same functions as the control section 1023 and the audio control section 1026 (FIG. 13).

That is to say, the client terminal CT has the hardware circuit block configuration according to the first embodiment as mentioned above. Since the CPU 11 uses various program modules, the client terminal CT can implement the same processes as the client terminal 1002 having the functional circuit block configuration according to the second embodiment.

The URL provision server 3 (FIG. 3) according to the above-mentioned first embodiment is functionally equivalent to the portal server 1003 (FIG. 14) according to the above-mentioned second embodiment. The control section 80 appropriately selects and follows various programs stored in the ROM 81 to function equivalently to the control section 1050, the communication control section 1052, and the authentication processing section 1056 of the portal server 1003. Further, the ROM 81, the RAM 82, and the URL storage DB 83 can be used equivalently to the customer database section 1054, the page information storage section 1055, the authentication information storage section 1057, the frequency information storage section 1058, and the URL storage section 1059 of the portal server 1003.

Further, the associated information provision server KS (FIG. 4) according to the above-mentioned first embodiment is functionally equivalent to the radio broadcast information delivery server 1006 (FIG. 15) according to the above-mentioned second embodiment. The control section 90 appropriately selects and follows various programs stored in the ROM 91 to function equivalently to the control section 1110, the communication control section 1112, the authentication processing section 1115, and the retrieval section 1118 of the radio broadcast information delivery server 1006. It is possible to use the ROM 91, the RAM 92, the musical composition information DB 93, and the program information DB 94 in the same manner as the customer database section 1114, the page information storage section 1116, the on-air-list information storage section 1117, the now-on-air information storage section 1119, and the authentication information storage section 1120 of the radio broadcast information delivery server 1006.

(3) Other Embodiments

There has been described the URL provision server 3 according to the above-mentioned embodiment. When the state information contains no URL, the URL provision server 3 determines that the radio station RS supplies no information provision service. The URL provision server 3 provides the state information by adding to it a message indicating unavailability of the information provision service. However, the present invention is not limited thereto. It may be preferable to use electronic mail to send a message indicating unavailability of the information provision service to the client terminal CT.

Further, according to the above-mentioned embodiment, the URL provision server 3 provides the client terminal CT with the state information passed from the associated information provision server KS. However, the present invention is not limited thereto. The URL provision server 3 may periodically retrieve the state information from the associated information provision server KS and provide the state information in accordance with a URL acquisition request from the client terminal CT.

According to the above-mentioned embodiment, the URL provision server 3 and the associated information provision server KS are provided independently. However, the present invention is not limited thereto. The URL provision server 3 and the associated information provision server KS may be unified to provide the state information directly to the client terminal CT.

According to the above-mentioned embodiment, the ROM 81 stores the state information provision program in advance. The URL provision server 3 loads this program into the RAM 82. In accordance with the state information provision program, the URL provision server 3 performs the above-mentioned state information provision sequence. However, the present invention is not limited thereto. It may be preferable to perform the state information provision sequence by installing the URL provision server 3 with a program storage medium that stores the state information provision program.

According to the above-mentioned embodiment, the ROM 13 stores the state information acquisition program in advance. The client terminal CT loads this program into the RAM 20. In accordance with the state information acquisition program, the client terminal CT performs the above-mentioned state information provision sequence. However, the present invention is not limited thereto. It may be preferable to perform the state information provision sequence by installing the client terminal CT with a program storage medium that stores the state information acquisition program.

According to the above-mentioned first embodiment, the URL provision server 3 functions as the information provision apparatus and the authentication server of the present invention. The URL provision server 3 is configured to comprise the data communication processing section 84 as reception means and the control section 80 and the data communication processing section 84 as transmission means. However, the present invention is not limited thereto. The other various circuits may be used to configure the information provision apparatus.

According to the above-mentioned first embodiment, the client terminal CT functions as the information reception apparatus of the present invention. The client terminal CT is configured to comprise the CPU 11, the communication processing section 22, and the network interface 23 as transmission and reception means. However, the present invention is not limited thereto. The other various circuits may be used to configure the information reception apparatus.

According to the above-mentioned second embodiment, the portal server 1003 functions as the information provision apparatus and the authentication server of the present invention. The portal server 1003 is configured to comprise the control section 1050 and the communication control section 1052 as reception and transmission means. However, the present invention is not limited thereto. The other various circuits may be used to configure the information provision apparatus.

According to the above-mentioned second embodiment, the client terminal 1002 functions as the information reception apparatus of the present invention. The client terminal 1002 is configured to comprise the control section 1023 and the communication processing section 1032 as transmission and reception means. However, the present invention is not limited thereto. The other various circuits may be used to configure the information reception apparatus.

According to the above-mentioned embodiment, the client terminal 1002 or CT can receive radio broadcast carried from the radio station. However, the present invention is not limited thereto. The client terminal 1002 or CT may receive Internet radio broadcast or satellite radio broadcast to acquire the associated information (radio broadcast information). Alternatively, the client terminal 1002 or CT may receive television broadcast carried from a television broadcast station and acquire various broadcast information and the like about television programs in the television broadcast from a networked server.

According to the above-mentioned embodiment, the client terminal 1002 or CT is provided with the hardware circuit blocks, the functional circuit blocks, and the program modules. However, the present invention is not limited thereto. These hardware circuit blocks and the like may be installed in not only the client terminal 1002 or CT, but also the other various terminals such as cellular phones, personal computers, and the like. The same processes as implemented on the above-mentioned client terminal 1002 or CT can be also implemented on terminals installed with the hardware circuit blocks, the functional circuit blocks, and the program modules.

INDUSTRIAL APPLICABILITY

The information provision method according to the present invention

The information provision method according to the present invention can be applied to the purpose of providing service states concerning an information provision service before access to a homepage for the information provision service.

EXPLANATION OF REFERENCE NUMERALS

1 . . . INFORMATION PROVISION SERVER, 2 . . . INTERNET, 3 . . . CLIENT TERMINAL, 1003 . . . PORTAL SERVER, 1006 . . . RADIO BROADCAST INFORMATION PROVISION SERVER, RS . . . RADIO STATION, KS . . . ASSOCIATED INFORMATION PROVISION SERVER

The invention claimed is:

1. A method of providing information from a server to a broadcast receiver, the method comprising:
receiving, from the broadcast receiver, identification information for identifying a currently received broadcast station;
receiving, from an external server, state information which indicates a state of a service for providing information concerning said currently received broadcast station corresponding to said identification information;
providing information, from the server, depending on whether a URL is included in the state information, the information indicating an unavailability of the service, upon a determination that the URL is not included in the state information; and
transmitting, to said broadcast receiver, said state information and said URL corresponding to said service, after receiving said identification information from said broadcast receiver and said state information from said external server, and upon a determination that the URL is included in the state information.

2. The method according to claim 1, wherein said transmitting provides said state information and said URL to said broadcast receiver at least when said service is available.

3. The method according to claim 1, further comprising:
performing an information provision service by transmitting information about said service to said broadcast receiver in accordance with an access to said URL from said broadcast receiver.

4. The method according to claim 1, wherein said transmitting provides additional information corresponding to said identification information as well as said state information to said broadcast receiver.

5. The method according to claim 1, wherein said external server is a content server that provides said service to said broadcast receiver, and said server is an URL provision server that transmits an address of said content server, which is the address transmitted in the transmitting.

6. The method according to claim 1, wherein
said server receives request information which requests information about said service and a service session ID equivalent to a session ID associated with said server, transmitted from said broadcast receiver based on said URL;
said server performs an authentication process based on said service session ID and, when an authentication error occurs, transmits information indicating the authentication error and identification information for identifying said server to said broadcast receiver;
an authentication server receives authentication ticket issuance request information which requests to issue an authentication ticket for an access to said server as well as an authentication session ID equivalent to a session ID associated with said authentication server, from said broadcast receiver;
said authentication server authenticates said authentication session ID, when granting an authentication, issues said authentication ticket, and transmits said authentication ticket to said broadcast receiver;
said server receives said authentication ticket transmitted from said broadcast receiver and transmits said authentication ticket to said authentication server;
said authentication server, when authenticating said authentication ticket to be valid, transmits information indicating authentication permission to said server;
said server receives said information indicating the authentication permission, issues a service session ID as a session ID associated with said broadcast receiver, and transmits said service session ID to said broadcast receiver;
said server, when granting an authentication, transmits associated information corresponding to said request information to said broadcast receiver.

7. An information provision apparatus, comprising:
reception means for receiving, from a broadcast receiver, identification information for identifying a currently received broadcast station, and for receiving, from an external server, state information which indicates a state of a service for providing information concerning said currently received broadcast station corresponding to said identification information; and
transmission means for providing information depending on whether a URL is included in the state information, the information indicating an unavailability of the service, upon a determination that the URL is not included in the state information, and for transmitting, to said broadcast receiver, said state information and said URL corresponding to said service, after a receiving of said identification information from said broadcast receiver and said state information from said external server, and upon a determination that the URL is included in the state information;
providing information, from the computer, depending on whether a URL is included in the state information, the information indicating an unavailability of the service, upon a determination that the URL is not included in the state information; and
transmitting, to said broadcast receiver, said state information and said URL corresponding to said service, after receiving said identification information from said broadcast receiver and said state information from said external server, and upon a determination that the URL is included in the state information.

8. The information provision apparatus according to claim 7, wherein said transmission means transmits said state information and said URL to said broadcast receiver at least when said service is available.

9. The information provision apparatus according to claim 7, further comprising:
an information provision service execution means for performing an information provision service by transmitting information about said service to said broadcast receiver in accordance with an access to said URL from said broadcast receiver.

10. The information provision apparatus according to claim 7, wherein said transmission means transmits additional information corresponding to said identification information as well as said state information to said broadcast receiver.

11. The information provision apparatus according to claim 7, external server wherein said external server is a content server that provides said service to said broadcast receiver, and said information provision apparatus is an URL provision server that transmits an address of said content server, which is the address transmitted by the transmission means.

12. A computer readable storage medium encoded with computer program instructions executable by a computer to implement a method of information processing, comprising:
receiving, from the broadcast receiver, identification information for identifying a currently received broadcast station;
receiving, from an external server, state information which indicates a state of a service for providing information concerning said currently received broadcast station corresponding to said identification information;
providing information, from the computer, depending on whether a URL is included in the state information, the information indicating an unavailability of the service, upon a determination that the URL is not included in the state information; and
transmitting, to said broadcast receiver, said state information and said URL corresponding to said service, after receiving said identification information from said broadcast receiver and said state information from said external server, and upon a determination that the URL is included in the state information.

13. An information provision apparatus, comprising:
a reception interface that receives, from a broadcast receiver, identification information identifying a currently received broadcast station, and that receives, from an external server, state information which indicates a state of a service for providing information concerning said currently received broadcast station corresponding to said identification information; and
a transmitter configured to provide information depending on whether a URL is included in the state information, the information indicating an unavailability of the service, upon a determination that the URL is not included in the state information, and to transmit, to said broadcast receiver, said state information and said URL corresponding to said service, after a receiving of said identification information from said broadcast receiver and said state information from said external server, and upon a determination that the URL is included in the state information.

* * * * *